(12) United States Patent
Llop et al.

(10) Patent No.: US 10,639,129 B2
(45) Date of Patent: May 5, 2020

(54) BONE FOUNDATION GUIDE SYSTEM AND METHOD

(71) Applicant: NATIONAL DENTEX, LLC, Palm Beach Gardens, FL (US)

(72) Inventors: Daniel R. Llop, Reno, NV (US); Armand C. Jusuf, Reno, NV (US); Ryan A. Spanke, Reno, NV (US); Charles T. Fanlo, Reno, NV (US)

(73) Assignee: NATIONAL DENTEX, LLC, Palm Beach Gardens, FL (US)

( * ) Notice: Subject to any disclaimer, the term of this patent is extended or adjusted under 35 U.S.C. 154(b) by 222 days.

(21) Appl. No.: 15/282,613

(22) Filed: Sep. 30, 2016

(65) Prior Publication Data

US 2017/0252126 A1  Sep. 7, 2017
US 2018/0028277 A9  Feb. 1, 2018

Related U.S. Application Data

(63) Continuation-in-part of application No. 15/062,109, filed on Mar. 5, 2016, now Pat. No. 10,278,789.
(Continued)

(51) Int. Cl.
*A61C 1/08* (2006.01)
*A61C 8/00* (2006.01)
(Continued)

(52) U.S. Cl.
CPC .......... *A61C 1/084* (2013.01); *A61C 8/0027* (2013.01); *A61C 8/0034* (2013.01);
(Continued)

(58) Field of Classification Search
CPC ...... A61C 1/084; A61C 8/0089; A61C 8/0006
(Continued)

(56) References Cited

U.S. PATENT DOCUMENTS

| 5,018,970 A | 5/1991 | Stordahl |
| 5,725,376 A | 3/1998 | Poirier |

(Continued)

FOREIGN PATENT DOCUMENTS

| CA | 2795668 | 11/2011 |
| CA | 2934371 | 6/2015 |

(Continued)

OTHER PUBLICATIONS

International Search Report and Written Opinion dated Dec. 28, 2017 for Application No. PCT/US2017/054804, 10 pgs.
(Continued)

*Primary Examiner* — Sean M Michalski
*Assistant Examiner* — Mirayda A Aponte
(74) *Attorney, Agent, or Firm* — Frost Brown Todd LLC

(57) ABSTRACT

A bone foundation guide system having a bone foundation guide with a foundation guide body forming an open surgical space connecting a top of the bone foundation guide body with a bottom of the bone foundation guide body, the bottom contoured to removably affix the bone foundation guide body to the bone of a dental implant surgical site, the body further contoured to guide the cutting of bone from a dental implant surgical site and supporting a dental implant surgical guide; the dental implant surgical guide contoured to removably mate to the bone foundation guide body; wherein a combination of the bone foundation guide and the dental implant surgical guide forms a double open-ended placement channel that passes through a plurality of guiding cylinders held in tandem alignment to aid in the placement of a dental implant that is anchored in a site remote from the mouth.

18 Claims, 30 Drawing Sheets

Related U.S. Application Data which is a continuation-in-part of application No. 14/921,111, filed on Oct. 23, 2015, now Pat. No. 10,398,530, which is a continuation-in-part of application No. 14/214,555, filed on Mar. 14, 2014, now Pat. No. 10,307,226.

(60) Provisional application No. 61/784,029, filed on Mar. 14, 2013.

(51) Int. Cl.
    *A61C 8/02* (2006.01)
    *A61C 13/00* (2006.01)

(52) U.S. Cl.
    CPC ........ *A61C 8/0092* (2013.01); *A61C 13/0004* (2013.01); *A61C 8/0006* (2013.01)

(58) Field of Classification Search
    USPC ........................................ 433/72, 75, 76, 79
    See application file for complete search history.

(56) References Cited

U.S. PATENT DOCUMENTS

| | | | |
|---|---|---|---|
| 5,967,777 A | 10/1999 | Klein et al. | |
| 6,319,006 B1 | 11/2001 | Scherer et al. | |
| 6,382,975 B1 | 5/2002 | Poirier | |
| 6,491,696 B1 | 12/2002 | Kunkel | |
| 6,672,870 B2 | 1/2004 | Knapp | |
| 6,814,575 B2 | 11/2004 | Poirier | |
| 6,997,707 B2 | 2/2006 | Germanier | |
| 7,331,786 B2 | 2/2008 | Poirier | |
| 7,632,097 B2 | 12/2009 | De Clerck | |
| 7,774,084 B2 | 8/2010 | Cinader, Jr. | |
| 7,824,181 B2 | 11/2010 | Sers | |
| 7,866,980 B2 | 1/2011 | Poirier | |
| 7,887,327 B2 | 2/2011 | Marotta | |
| 7,905,726 B2 | 3/2011 | Stumpel | |
| 7,909,606 B2 | 3/2011 | Marcello | |
| 7,942,668 B2 | 5/2011 | Brajnovic et al. | |
| 8,011,927 B2 | 9/2011 | Berckmans, III et al. | |
| 8,021,153 B2 | 9/2011 | Poirier | |
| 8,038,440 B2 | 10/2011 | Swaelens et al. | |
| 8,135,492 B2 | 3/2012 | Yau et al. | |
| 8,142,189 B2 | 3/2012 | Brajnovic | |
| 8,352,060 B2 | 1/2013 | Chun et al. | |
| 8,364,301 B2 | 1/2013 | Schmitt | |
| 8,371,849 B2 | 2/2013 | Gao | |
| 8,529,255 B2 | 9/2013 | Poirier et al. | |
| 8,540,510 B2 | 9/2013 | Brajnovic | |
| 8,574,302 B2 | 11/2013 | McKay | |
| 8,585,402 B2 | 11/2013 | Vogel et al. | |
| 8,706,672 B2 | 4/2014 | Malfliet et al. | |
| 8,770,972 B2 | 7/2014 | Swaelens et al. | |
| 8,777,612 B2 | 7/2014 | Suttin et al. | |
| 8,827,699 B2 | 9/2014 | Bavar | |
| 8,899,984 B2 | 12/2014 | Llop et al. | |
| 9,069,914 B2 | 6/2015 | Kopelman et al. | |
| 9,107,723 B2 | 8/2015 | Hall et al. | |
| 9,155,548 B2 | 10/2015 | Lin | |
| 9,155,599 B2 | 10/2015 | Thompson et al. | |
| 9,161,822 B2 | 10/2015 | Stevens et al. | |
| 9,168,112 B2 | 10/2015 | Haber | |
| 9,173,723 B2 | 11/2015 | Harrison | |
| 9,211,165 B2 | 12/2015 | Jamison | |
| 9,226,801 B2 | 1/2016 | Groscurth et al. | |
| 9,259,291 B2 | 2/2016 | Gantes | |
| 9,308,055 B2 | 4/2016 | Fisker et al. | |
| 9,336,336 B2 | 5/2016 | Deichmann et al. | |
| 9,358,082 B2 | 6/2016 | Nilsson | |
| 9,381,072 B2 | 7/2016 | Furrer et al. | |
| 9,402,698 B2 | 8/2016 | Thompson et al. | |
| 9,408,678 B2 | 8/2016 | Harrison | |
| 9,498,307 B2 | 11/2016 | Harrison | |
| 9,504,533 B2 | 11/2016 | Groscurth et al. | |
| 9,504,535 B2 | 11/2016 | Haber | |
| 9,504,538 B2 | 11/2016 | Sachdeva et al. | |
| 9,554,879 B2 | 1/2017 | Harrison | |
| 9,561,088 B2 | 2/2017 | Sachdeva et al. | |
| 9,585,730 B2 | 3/2017 | Kim et al. | |
| 9,649,178 B2 | 5/2017 | Ali | |
| 9,675,796 B2 | 6/2017 | Dayan et al. | |
| 9,700,380 B2 | 7/2017 | Kim et al. | |
| 9,730,777 B2 | 8/2017 | Bullis et al. | |
| 9,795,345 B2 | 10/2017 | Berckmans, III et al. | |
| 9,795,458 B2 | 10/2017 | Llop | |
| 9,801,699 B2 | 10/2017 | Okay | |
| 9,848,836 B2 | 12/2017 | Berckmans, III et al. | |
| 9,848,965 B2 | 12/2017 | Kim et al. | |
| 2006/0166169 A1 | 7/2006 | Dawood | |
| 2007/0162014 A1 | 7/2007 | Campbell et al. | |
| 2009/0092948 A1 | 4/2009 | Gantes | |
| 2009/0239197 A1* | 9/2009 | Brajnovic | A61C 1/084 433/174 |
| 2009/0274990 A1 | 11/2009 | Kim | |
| 2009/0298008 A1 | 12/2009 | Groscurth et al. | |
| 2010/0035201 A1 | 2/2010 | Beck et al. | |
| 2010/0124731 A1 | 5/2010 | Groscurth et al. | |
| 2010/0316974 A1 | 12/2010 | Yau et al. | |
| 2011/0033819 A1 | 2/2011 | Freyer et al. | |
| 2011/0045431 A1 | 2/2011 | Groscurth et al. | |
| 2011/0045432 A1 | 2/2011 | Groscurth et al. | |
| 2011/0111371 A1 | 5/2011 | Haber | |
| 2011/0151399 A1 | 6/2011 | De Clerck et al. | |
| 2011/0256508 A1 | 10/2011 | Gantes | |
| 2012/0046914 A1 | 2/2012 | Gao | |
| 2012/0053593 A1 | 3/2012 | Abboud | |
| 2012/0156638 A1 | 6/2012 | Gantes | |
| 2012/0257936 A1* | 10/2012 | Abboud | A61C 1/084 408/1 R |
| 2012/0261848 A1 | 10/2012 | Haraszti | |
| 2012/0277899 A1 | 11/2012 | Chun et al. | |
| 2013/0011813 A1 | 1/2013 | Garcia et al. | |
| 2013/0023888 A1 | 1/2013 | Choi et al. | |
| 2013/0209956 A1 | 8/2013 | Sanders | |
| 2013/0252202 A1 | 9/2013 | Pardeller et al. | |
| 2014/0026419 A1 | 1/2014 | Haber | |
| 2014/0080086 A1 | 3/2014 | Chen | |
| 2014/0080092 A1 | 3/2014 | Suttin et al. | |
| 2014/0255876 A1 | 9/2014 | Alpern et al. | |
| 2014/0272778 A1 | 9/2014 | Llop | |
| 2015/0003099 A1 | 1/2015 | Villa | |
| 2015/0010881 A1 | 1/2015 | Llop | |
| 2015/0025855 A1 | 1/2015 | Fisker et al. | |
| 2015/0030995 A1 | 1/2015 | Villa | |
| 2015/0111179 A1 | 4/2015 | Suttin | |
| 2015/0150684 A1 | 6/2015 | De Clerck | |
| 2015/0230894 A1 | 8/2015 | Juzbasic et al. | |
| 2015/0272704 A1 | 10/2015 | Watson et al. | |
| 2015/0272705 A1 | 10/2015 | Watson et al. | |
| 2016/0038255 A1 | 2/2016 | Llop | |
| 2016/0106517 A1 | 4/2016 | Groscurth et al. | |
| 2016/0106518 A1 | 4/2016 | Choi et al. | |
| 2016/0128810 A1 | 5/2016 | Fostick et al. | |
| 2016/0157970 A1 | 6/2016 | Gantes | |
| 2016/0278878 A1 | 9/2016 | Watson et al. | |
| 2016/0324599 A1 | 11/2016 | Harrison | |
| 2017/0071697 A1 | 3/2017 | Groscurth et al. | |
| 2017/0112591 A1 | 4/2017 | Llop | |
| 2017/0112592 A1 | 4/2017 | Groscurth et al. | |

FOREIGN PATENT DOCUMENTS

| | | | |
|---|---|---|---|
| EP | 2 425 797 A1 | 3/2012 | |
| MX | 2014001163 | 7/2015 | |
| WO | WO 2010/061391 | 6/2010 | |
| WO | WO2012007615 A3 | 3/2012 | |
| WO | WO-2013181721 A2 * | 12/2013 | ........... A61F 2/2803 |

(56) References Cited

FOREIGN PATENT DOCUMENTS

WO   WO 2014/130536    8/2014
WO   WO 2015/148891    10/2015

OTHER PUBLICATIONS

Online video of zygomatic dental implant sugery: http://www.youtube.com/watch?v=TGBxbP9aa2g&sns=em Title Zygomatic Implant Guided Surgery—Noris Medical, Published on Mar. 11, 2015, 1 pg.

Select pages showing a bone reduction guide from the publication Art of Computer Guided Implantology by Tradiev and Rosenfeld, Copyright 2009, 3 pgs.

Website showing a bone reduction guide that was uploaded by www.dentalinformation.com on Aug. 4, 2011 located at https://www.youtube.com/watch?v=AZnReFZmLN8 the upload is entitled Bone Reduction and Bone Supported Guide for Guided Dental Implant Surgery, 1 pg.

Inernational Search Report and Written Opinion dated Mar. 2, 2016 for Application No. PCT/US2015/061002, 14 pgs.

International Search Report and Written Opinion dated Jul. 26, 2016 for Application No. PCT/US2016/021097, 13 pgs.

International Search Report and Written Opinion dated Jun. 16, 2017 for Application No. PCT/US2017/020746, 13 pgs.

Online video of zygomatic dental implant surgery: http://www.youtube.com/watch?v=TGBxbP9aa2g&sns=em Title Zygomatic Implant Guided Surgery—Noris Medical Published on Mar 11, 2015.

U.S. Appl. No. 14/214,555, now US Pub. No. 2014/0272778.
U.S. Appl. No. 14/495,304, now US Pub. No. 2015/0010881.
U.S. Appl. No. 14/921,111, now US Pub. No. 2016/0038255.
U.S. Appl. No. 15/062,109, now US Pub. No. 2017/0112591.

* cited by examiner

BONE FOUNDATION GUIDE SYSTEM AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention generally relates to bone foundation guides that can support respective dental implant surgical guides, the combination of the two guides can form a placement channel passing through multiple, spaced-apart guiding cylinders aligned in tandem, the placement channel may be subsequently used to create an implant channel that supports a dental implant that may originate in the patient's mouth and may be anchored in a portion of the skull remote from the patient's mouth.

BACKGROUND

As a person ages, they generally incur tooth and bone loss requiring prosthetic replacement as provided by the dental profession. One of the more important aspects of this replacement procedure is the need to solidly anchor within the available bone structure those implants used to secure individual (replacement artificial tooth) or collective (e.g., denture) dental prosthetic. When teeth lose bone around their roots, the bone (e.g., mandibular strut or the maxillary strut) may become uneven (either thinned out or too bulky) in various places in the respective dental strut. This bone condition may make the dental restorative process in that particular area more difficult than when such bone loss has not occurred. It could be thought as building a house whose foundation on an unleveled or uneven ground.

In order for the dental prosthetic (or restoration) to be properly fitted to the patient in a substantially esthetically and functionally acceptable position, the dental health care professional (e.g. dental surgeon) may first have to alter the bone of the dental surgical site (especially in those situations where the dental prosthetic is redressing significant tooth loss). This corrective process could start by making one or more incisions in gum area that otherwise designates the dental surgical or restoration site. These incisions substantially allow the gum tissue to be peeled back to expose the bone at the dental surgical site. The dental surgeon, in order to generally make dental surgical site/dental arch symmetrical in all relevant dimensions for the dental restoration (e.g., removable denture) or implant sites (e.g. fixed prosthetics) may then apply one or more cutting tools to generally reduce or remove unwanted high points or thickened places on the exposed bone structure. In other instances, the dental surgeon may add bone material to the exposed bone structure to further fill out the arch's profile or otherwise strengthen its structure.

During this process, the dental surgeon could bring the top portion of the alveolar ridge (e.g., one of the two jaw ridges either on the roof of the mouth or the bottom of the mouth that contain the sockets or alveoli of the teeth) to the correct surgical dimensions ("leveling out") by utilizing a bone foundation guide generally placed upon and secured to the bone structure to substantially guide the cutting/augmenting of the exposed bone. The bone foundation guide solves the problem of "estimating" the vertical height and width of the bone at the "coronal" level by guiding the surgeon's operation of the cutting tools and/or augmentation of the bone. This allows subsequent and accurate placement of the dental implants and respective prosthetics at the proper patient-specific vertical and horizontal levels. This bone adjustment process may also provide for the creation of the proper inter-occlusal room (e.g., the space that exists between the opposing teeth and the open tissue (e.g., that will receive the dental prosthetic) to generally insure that proper jaw operation and alignment, smile line and phonetics occur when the final dental prosthetic is finally located within the patient's mouth.

After the exposed bone has been properly been prepared (e.g., reduced or augmented), the bone foundation guide may be removed. A dental implant surgical guide may be subsequently fitted and attached in its place at the remodeled bone of dental surgical site. The dental implant surgical guide may be used to guide the operation of implant accessories needed to prepare the dental surgical site to receive the dental implants. The dental implant surgical guide may then be used to suitably locate the dental implants into the prepared bone structure.

After the dental implants are properly located, the dental implant surgical guide may be removed and healing abutments (if required) may be fitted to the dental implants to create a space in the reattached gum proximate to the dental implant(s) that receives a portion (e.g., the base) of prosthetic or prosthesis (e.g., artificial tooth). Once the healing abutments are attached, the gum tissue may sutured back up and around the dental implant-healing abutment combination.

As needed, a full upper or full lower denture/tooth may be fitted to the implants either at the close of the dental surgery or later after healing of the tissues/osseo-integration of bone to implant(s) has occurred. Once the healing/osseo-integration has finalized, the dental surgeon could remove the healing abutments to open up the space proximate to the implants that receives the base of the prosthetic to place and affix the dental prosthetic securely to the implant(s).

The bone foundation guide and the implant dental surgical guide for the implants are generally considered separate instruments that are generally designed, manufactured and used independently of one another other. The design and creation of these guides can be now be accomplished through digital dentistry (e.g., pre-surgical digital methods and associated apparatuses to obtain and merge medical imaging information taken from the patient's mouth and/or dental castings of the patient's mouth to create a patient-specific virtual models of the preoperative and post-operative mouth and a surgical plan connecting the two models) or manually by dental art and hand (e.g., analogue dental design and preparation).

This separation or compartmentalization of dental guide capabilities could result in higher costs, manpower, and surgical time that could be found than if the two dental guides could be combined into one multipurpose device. The use of such a combination dental appliance could accordingly lead to an increase in the affordability of such dental procedures and results.

Another issue that may arise in such dental implant surgeries is when the dental healthcare professionals locate and affix the bone foundation guide physically upon the dental surgical site (e.g., a portion of bone.) Generally, the dental healthcare professional has to juggle both tasks of locating and affixing (e.g., drilling into the bone for fasteners, then using fasteners to secure the bone foundation guide onto bone) at the same time. The dental healthcare professional in having juggling both tasks may not properly locate the bone foundation guide in desired area of the dental surgical site; may not properly secure the bone foundation guide in place or both.

Yet another issue that may arise related to dental implant surgeries on the upper alveolar ridge (e.g., upper jaw) of a patient and in particular those rear portions of the upper alveolar ridge that otherwise may support and secure the molars and premolars, the posterior maxilla. If the patient has suffer significant tooth loss or is totally edentulous (e.g., especially in the posterior maxilla) there may be a tendency for the floor of the maxillary sinus cavity, the maxillary sinus cavity generally being located above the posterior maxillary, to expand and descend downward towards the top of the respective posterior maxilla substantially reducing the amount and thickness of bone in the posterior maxilla. In severe edentulous cases, the posterior maxilla on both sides of the upper jaw, along with other portions of the upper jaw, may substantially recede and contract towards the upper mouth portion (e.g., soft palate.) As a result, there may be insufficient amount of bone in both posterior maxilla sections (e.g., both rear upper jaw areas) to properly anchor any standard jawbone dental implant placed in the posterior maxilla.

One possible remedy could be a sinus lift or a sinus augmentation operation may be performed to augment the top of the posterior maxilla bone with bone graft material. By going through the maxillary sinus, bone graft material can be inserted on top of the posterior maxilla bone to generally allow anchoring standard dental implants at the posterior maxilla portions. However, older dental patients who may not wish to wait for the healing wait time (e.g., needed for bone graft material integration with the posterior maxilla bone); endure the discomfort resulting from such operations or both may wish to pursue alternative implant securing methods.

As substantially shown in FIGS. 33-33C, alternative implant securing methods or processes could involve anchoring of dental implant(s) into remote anchoring site 304, a skull bone structure that is generally considered remote from the patients mouth 19 to substantially position the dental implant's prosthesis attaching end by the respective posterior maxilla 308 (rear portions of the upper alveolar ridge 306.) Generally, there are two types of such remote anchored dental implants: namely a zygomatic (e.g., cheekbone-anchored) dental implant 300 and pterygoid (e.g., skull structure found behind and above the posterior maxilla) dental implant 302. Both zygomatic and pterygoid dental implants 300, 302 are generally significantly longer in length than standard dental implants to allow attachment to the remote anchoring site 304.

The zygomatic dental implant 300 generally could be placed and remotely anchored to the check bone 310 (also known as the zygomatic bone) using three different process: anchoring bone enclosure only process; the partial bone enclosure process and full bone enclosure process. The generally more common of these anchoring processes could be the partial bone enclosure process wherein a portion (e.g., mid-portion) of the zygomatic dental implant 300 generally passes outside of any bone or sinus structures located between the zygomatic bone 310 and the posterior maxilla 308. In this manner, the zygomatic dental implant 300 may pass enter into and through a portion of the posterior maxilla 308; then into and through the maxillary sinus cavity 321; passes out through the bone structure substantially defining the maxilla sinus cavity 321 (and any other proximate bone structure) until the zygomatic dental implant 300 reaches and anchors into the remote anchoring site 304 (e.g., underside of the zygomatic or check bone 310.) The section (e.g., midsection) of the zygomatic dental implant 300 could be laid outside of skull's bone and sinus structure to be generally covered by respective facial tissue and muscle. The prosthesis attachment end of the dental zygomatic implant 300 may generally remain uncovered (e.g., until suitable attachment to a desired dental prosthesis—not shown) to be substantially located at or by the posterior maxilla 308.

The lesser common implant anchoring process could be the anchoring bone enclosure only process. This process could be used when there is an insufficient amount posterior maxilla bone for the zygomatic dental implant 300 to pass through; the zygomatic dental implant's orientation, placement, rotational trajectory require such or other such implant factors may require the zygomatic implant 300 to substantially pass free of the posterior maxilla 308 and maxillary sinus structures for remote site anchoring. In this portion, the zygomatic dental implant's midsection or mid portion generally could be covered by facial tissue and muscle (not shown) until the zygomatic dental implant 300 reaches the patient's mouth 19 to generally locate the zygomatic implant's prosthesis attachment end by, but not necessarily in, the posterior maxilla 308.

The third process or full implant enclosure process could be used where the patient has strong or broad cheek bone structure and may still have significant posterior maxilla structure 308 so that the zygomatic dental implant 300 could be generally introduced through the posterior maxilla 308 and then subsequently through the maxilla sinus cavity 321 to generally pass through skull bone or sinus structure until anchoring into the check bone 310 with the majority of the zygomatic dental implant 300 generally being encompassed by skull bone and sinus structure with the exception of the zygomatic dental implant's prosthesis attachment end. It could be appreciated that one dental prosthesis could be secured to several zygomatic dental implants 300 that are remotely anchored using these various processes.

The pterygoid dental implant 302 may have an implant channel 318 that pass ups through a rear of the ridge of the posterior maxilla 308, through a maxillary tuberosity 312 (e.g., substantially located up from and behind the rear end of the posterior maxilla 308) and into a pterygoid plate 314 (e.g., substantially located adjacent to the back of the maxillary tuberosity 312.) Most of the pterygoid dental implant 302 may be engaged by skull bone structure with the general exception of the pterygoid dental implant's prosthesis attaching end.

One possible problem with anchoring a dental implant into an anchoring site remote from the mouth is that a distance that the dental implant needs to bridge between the prosthesis and the desired remote anchoring site may be significantly greater than a distance needed for a standard upper ridge anchored implant to be anchored within the mouth. This greater distance could correspondingly increase the drilling distance generally needed to create the respective implant channel that the remote anchor implant could go through to reach the remote anchoring site. The greater drilling distance or length of implant channel could increase the degree of error to occur when attempting to terminate the implant channel at the remote implant anchoring site.

Currently, remote anchored implant placement may be done freehand or may be done with the dental implant surgical guide using just one guiding cylinder (e.g., a master tube in a dental implant surgical guide as generally combined with a dental drill key.) Using just one such guiding cylinder to guide the drilling bit could allow the drill bit to drift off target as the drill bit in creating the implant channel moves closer to the remote anchoring site and away from the guidance of the guiding cylinder. The drill bit drift could interfere with the proper implant channel creation (as it generally relates to depth, rotation, trajectory, etc.) and result in missing a desired implant channel entry point at the remote anchoring site location. The missed anchoring point could cause the prosthesis securing end of the remote dental implant to be placed outside the desired orientation, telemetry, rotation and the like as generally needed for proper attachment to the dental prosthesis. Although such a remote dental implant misalignment could be corrected by an angled abutment, such a solution could still result in the patent having a noticeable and awkward feeling in the mouth. Further, substantial drill bit drift could result in unwanted physical damage to the patient ranging from the serious interference with muscular, vascular, skeletal, nerve and vison operations (e.g., for the zygomatic dental implant-drilling into and significantly damaging the associated eye, possibly resulting in blindness; for the pterygoid dental implant-drilling into an artery with possible arterial rupture and patient bleed-out.)

What could be needed to generally reduce the occurrence of such drill bit drift could be the present invention, namely a bone foundation guide system generally comprising an in tandem alignment of multiple, spaced guiding cylinders (e.g., master tubes, dental drill keys or both) substantially supported by a combination of artificial structures (e.g., bone foundation guide, dental implant surgical) or a combination of natural structure(s) (e.g., a perforated posterior maxilla's exposed bone holding a dental drill key) and artificial structure(s) to substantially form a placement channel to guide the subsequent creation of an implant channel through portions of the upper jaw, remainder portions of the skull or both to properly reach the desired dental implant anchoring site remote from mouth.

Multiple tandemly aligned guiding cylinders as held by the combination of structures could form a placement channel that could substantially have a greater length and precision than if the placement channel was formed by only one such structure (e.g., dental implant surgical guide) having only one guiding cylinder through which the placement channel passes or if otherwise done free hand without benefit of any guiding cylinder. Each guiding cylinder so held in tandem combination with other guiding cylinders could provide a precision crafted guide for controlling the orientation, telemetry, positioning and alike of a drill bit passing through the formed placement channel to generally create an implant channel that properly terminates in the remote implant anchor site. Further, such a formed placement channel, by rough analogy, could be similar to a gun barrel having two aiming sights. Increasing length of the placement channel, passing the implant channel through multiple tandemly aligned, spaced-apart guiding cylinders could substantially increase the precision of the drill bit delivery through bone, sinus and alike skull structure to create a resulting implant channel that accurately terminates in the desired area of the implant anchoring site and promotes the desired remote dental implant telemetry, orientation and rotation as substantially set by respective attachment at the remote anchoring site.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide an dental implant surgical guide that removably combines with a bone foundation guide to properly place a dental implant-retained prosthesis to a dental surgical site in a manner that reduces patient stress and bruising that may occur than if the two guides were applied separately;

the ability to use a digital virtual model of patent mouth to design a bone foundation guide wherein both the bone foundation guide and a dental implant surgical guide can be conjoined in situ properly locate a one or more dental implants that could be used to locate and secure a fixed dental prosthetic;

to provide a bone foundation guide and dental implant surgical guide that can be combined together to substantially reduce cost, time and man-hours needed in a dental implant surgical procedure to properly locate and attach a dental prosthetic to a dental surgical site;

the ability to use digital dentistry to control the design and manufacture of a dental implant surgical guide-bone foundation guide combination in a manner that digitally controls and refines the accuracy of the resulting bone foundation guide; dental implant surgical guide and a final fixed prosthetic; and to provide a bone foundation guide that is used in conjunction with a tissue spacing gasket, the tissue spacing gasket being used to help properly locate the placement of a prosthesis relative to the placed dental implant(s) by generally taking into account the height (or depth) of gum tissue that could normally cover the exposed bone at the dental implant surgical site;

the ability to design and manufacture a bone foundation guide system wherein a dental implant surgical guide or a tissue spacing gasket that could alternatively could mate and interlock with the bone foundation to generally allow implant components, dental implant or both to pass through the assembled combination onto the bone at a dental surgical guide;

to provide a dental surgical implant guide, bone foundation guide, and tissue spacing gasket to have matching contours and aligned openings and apertures that allow guides and gasket to be assembled into combinations to properly locate and attach a fixed prosthetic to an implant at a dental surgical site;

to provide a combination of structures that generally forms a double open-ended placement channel passing through tandemly-aligned, multiple guiding cylinders for the formation of a remotely anchored dental implant's implant channel that terminates in desired area of a dental implant anchoring site that is remote from the mouth;

the ability place a dental drill through a set of guiding cylinders held by a combination of bone foundation guide and dental implant surgical guide, the dental surgical guide guiding the entrance into and the bone foundation guiding the exit out of a placement channel;

to provide a combination of a bone foundation guide and dental implant surgical guide forming remotely anchored dental implant's placement channel for creating an implant channel, each guide having at least one guiding cylinder that is located at least proximate to a respective end of the placement channel;

the ability to combine a bone foundation guide and dental implant surgical guide to form a remotely anchored dental implant's placement channel having at least two guiding cylinders that increases the accuracy and precision by which the combination can correctly place and anchor a remotely anchored implant;

to provide a combination of a bone foundation guide and a dental implant surgical guide wherein a portion of the dental implant surgical guide and a portion of the bone foundation guide are used to create respective open ends of a placement channel for guiding dental drill bits to create an implant channel passing into at least a portion of skull structure for locating a remotely anchored implant;

the ability to move a drill bit through a dental drill key removably held in penetrating aperture in the posterior maxilla's exposed bone to create an implant channel for a remotely anchored dental implant;

to provide a remotely anchored dental implant's placement channel encompassing an drill key held in a penetrating aperture in posterior maxilla's exposed bone;

the ability to change the operating diameters of a formed placement channel's guiding cylinders as formed by a combination of a bone foundation guide and a dental implant surgical guide;

to provide a remotely anchored dental implant's placement channel formed by overlaying a combination of dental implant surgical guide and a bone foundation guide over a penetrating aperture in posterior maxilla's exposed bone that connects to the maxillary sinus, the dental implant surgical guide holding a guiding cylinder (e.g., a master tube and drill key combination) in alignment with the penetrating aperture, the penetrating aperture further removably holding a guiding cylinder (e.g., a dental drill key); and to provide a bone foundation guide and a dental implant surgical guide combination through whose guiding cylinders passes the placement channel, the diameter of the placement channel can be altered at through the use of one or more nesting tubular inserts passing through respective guiding cylinders.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be a bone foundation guide system having a bone foundation guide with a foundation guide body forming an open surgical space connecting a top of the bone foundation guide body with a bottom of the bone foundation guide body, the bottom contoured to removably affix the bone foundation guide body to a dental implant surgical site, guiding the cutting of bone from a dental implant surgical site as well as supporting a dental implant surgical guide; the dental implant surgical guide is contoured to removably mate to the bone foundation guide body; wherein a combination of the bone foundation guide and the dental implant surgical guide forms a double open-ended placement channel that passes through a plurality of guiding cylinders held in tandem alignment.

Another embodiment of the invention could be a process of using a bone foundation guide system comprising the following steps: providing a bone foundation guide comprising a body having a buccal wall and a lingual wall that is continuously connected by a first end and a second end forming an open surgical space that further connects a top of the body with a bottom of the body, the bottom is further contoured to removably receive at least a portion of a bone segment of a dental implant surgical site, the body further configured to at least removably support a dental implant surgical guide; providing a dental implant surgical guide that removably attaches to the bone foundation guide; forming a combination of the bone foundation guide and the dental implant surgical guide the combination further forms a placement channel that passes through a plurality of guiding cylinders held in tandem alignment.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
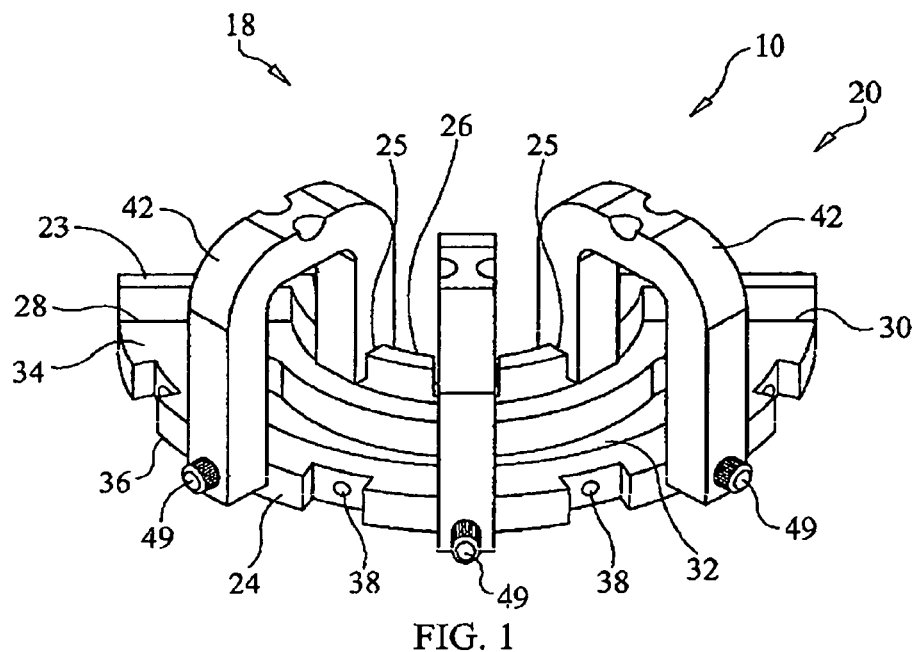
FIG. 1 is substantially a perspective bottom side view of one possible embodiment of the bone foundation guide the invention.
Figure 2:
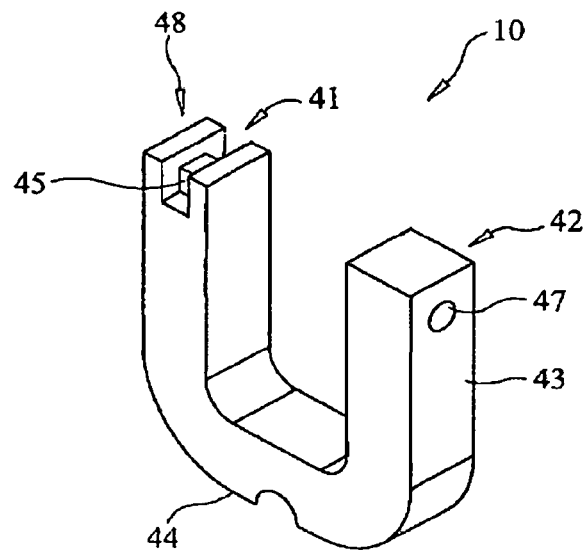
FIG. 2 is a top side perspective view of one possible embodiment of anchoring strut of the present invention.
Figure 3:
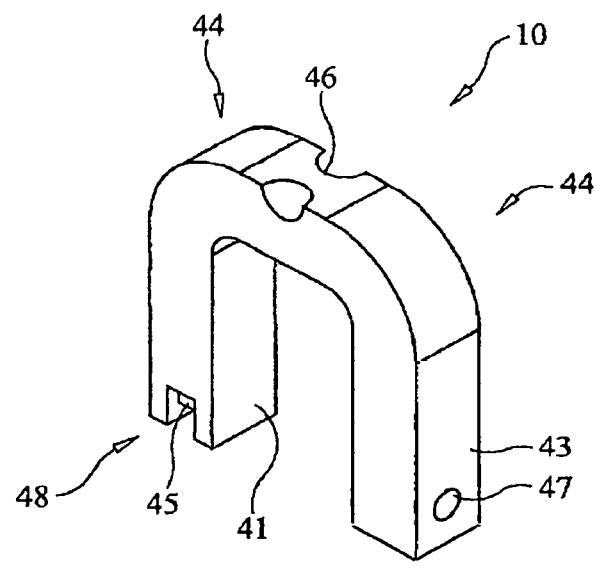
FIG. 3 is a bottom side perspective view of one possible embodiment of anchoring strut of the present invention.
Figure 4:
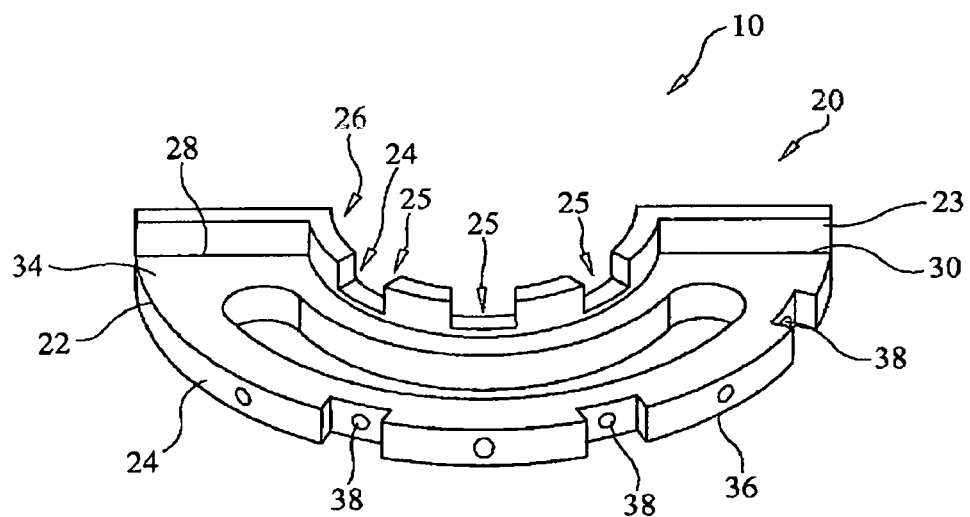
FIG. 4 is substantially a bottom side perspective view of one possible embodiment of the body.
Figure 5:
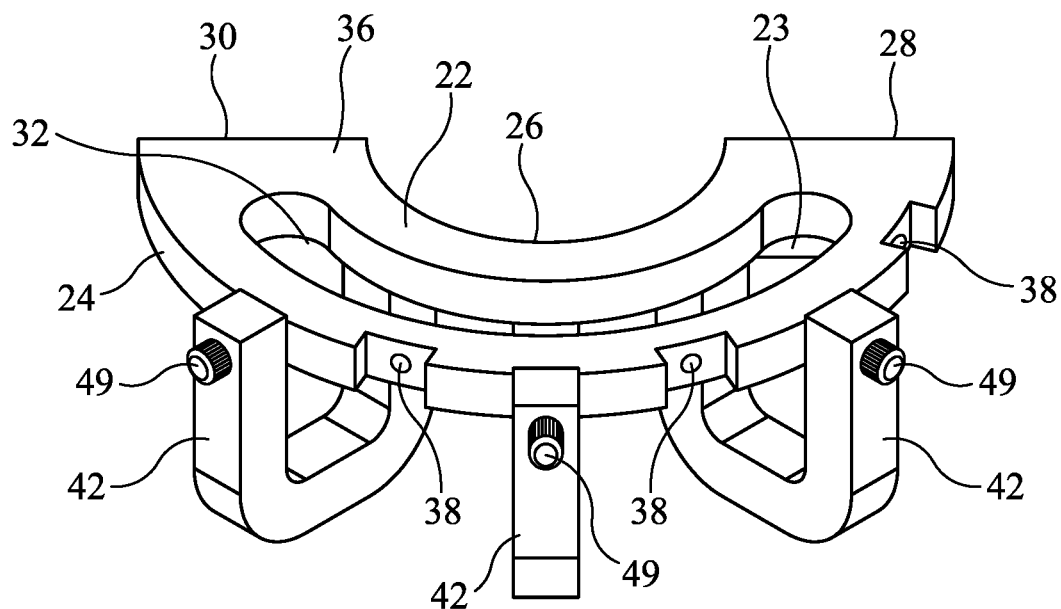
FIG. 5 is substantially a perspective top side view of one embodiment of the bone foundation guide.
Figure 6:
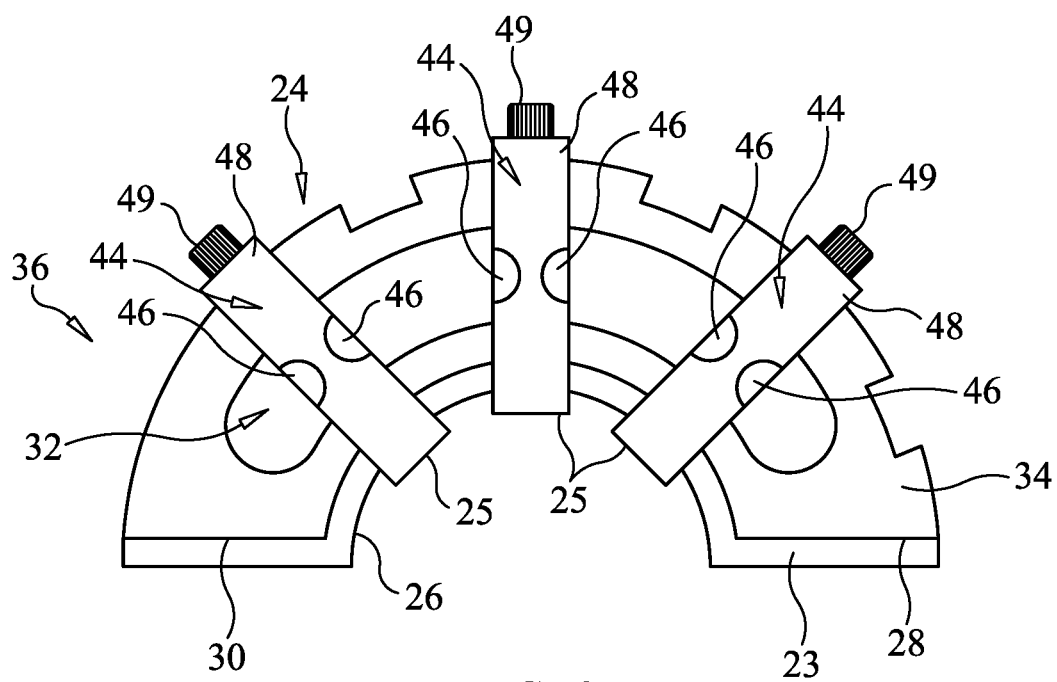
FIG. 6 is substantially a bottom elevation view of one embodiment of the bone foundation guide.
Figure 7:
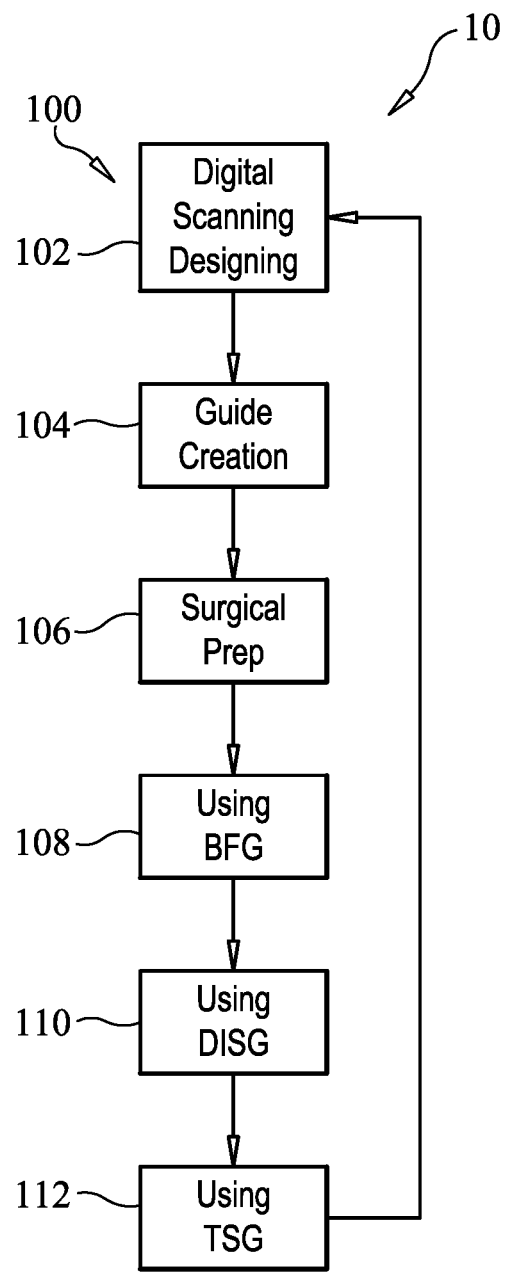
FIG. 7 is substantially a flow chart schematic showing a method of using the invention.
Figure 8:
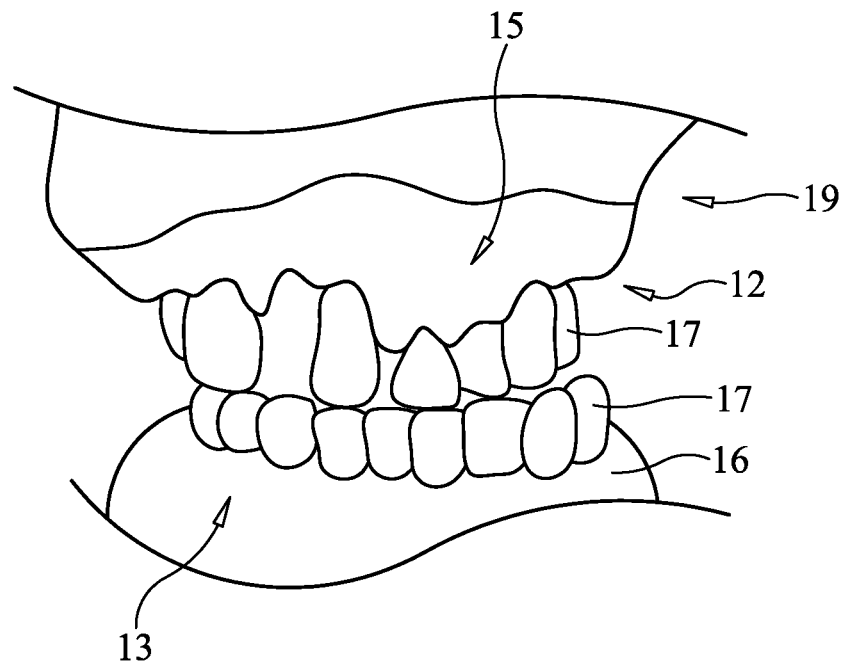
FIG. 8 is substantially an elevation view of patient's mouth showing exposed bone portion of the dental surgical site.
Figure 9:
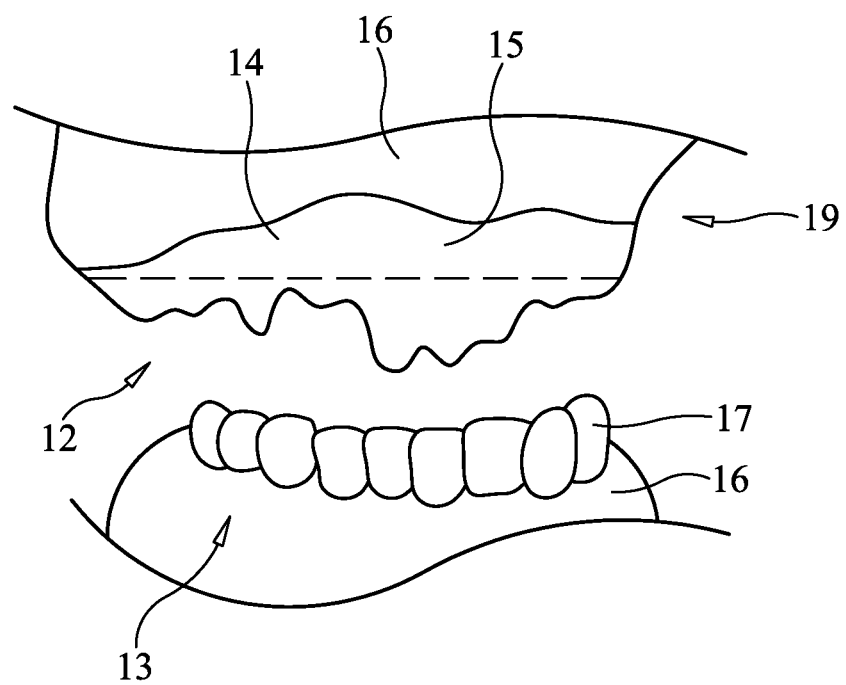
FIG. 9 is substantially an elevation view of patient's mouth showing exposed bone portion of the dental surgical site in an edentulous preoperative state.
Figure 10:
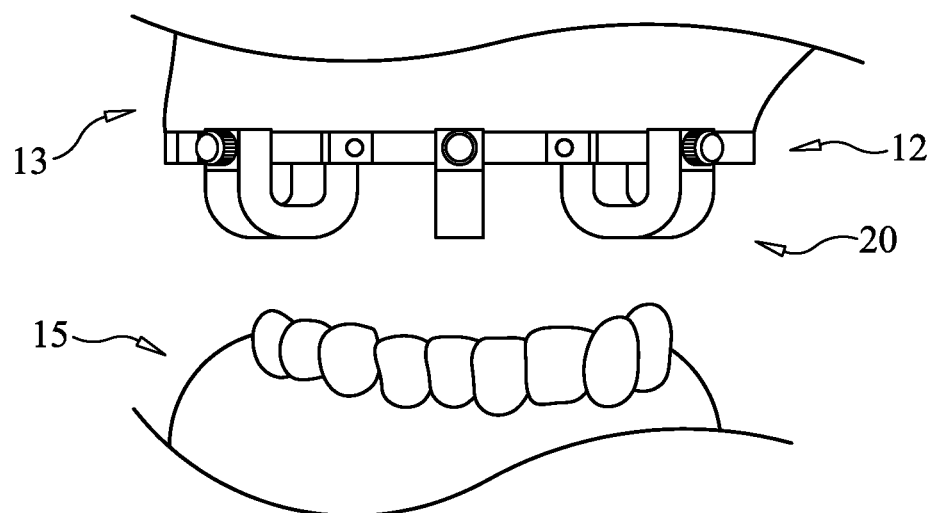
FIG. 10 is substantially a perspective front view of one embodiment of the bone foundation guide with struts being applied to the dental surgical site.
Figure 11:
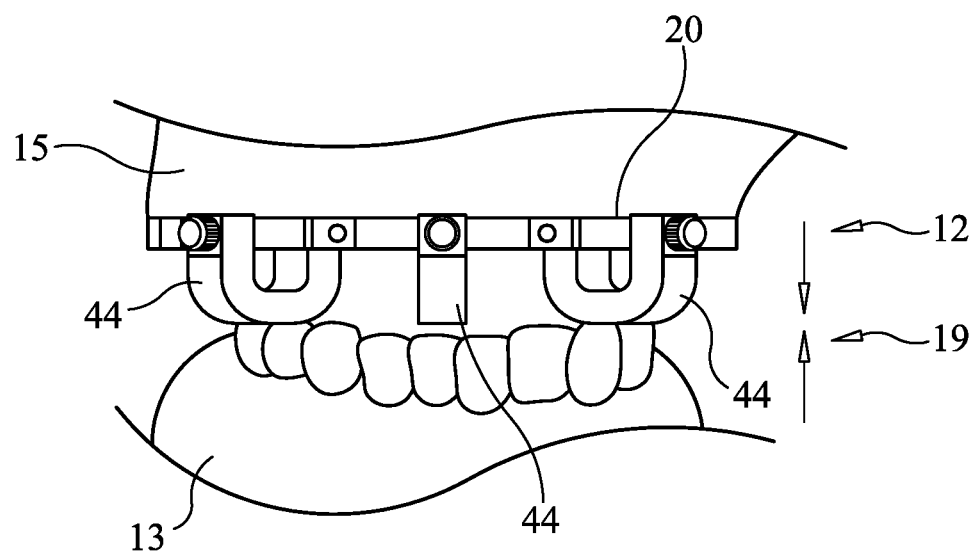
FIG. 11 is substantially a front perspective view of the bone foundation guide with struts being bitten down upon by the patient.
Figure 12:
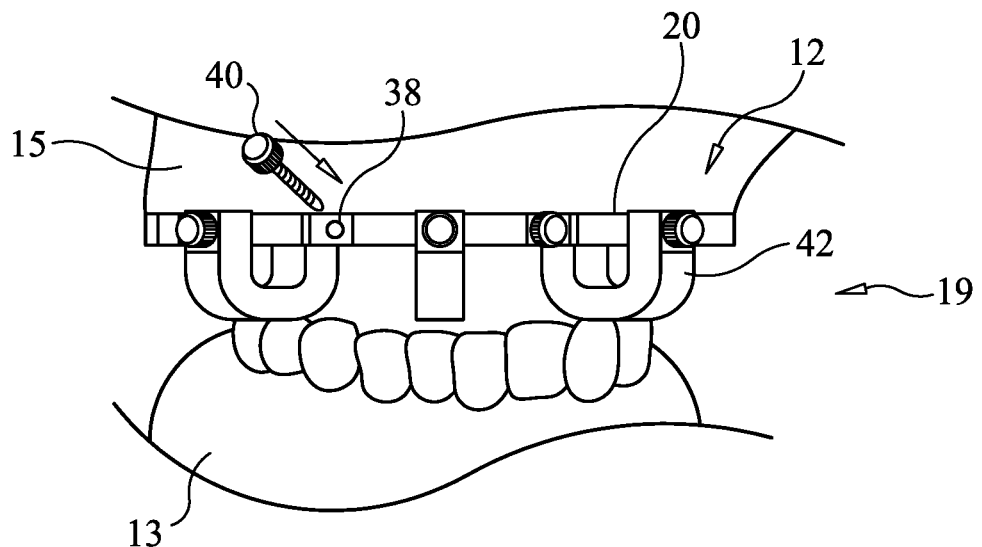
FIG. 12 is a front perspective view of the bone foundation guide with struts with the patient releasing its grip on the bone foundation guide and the strut fasteners being removed.
Figure 17:
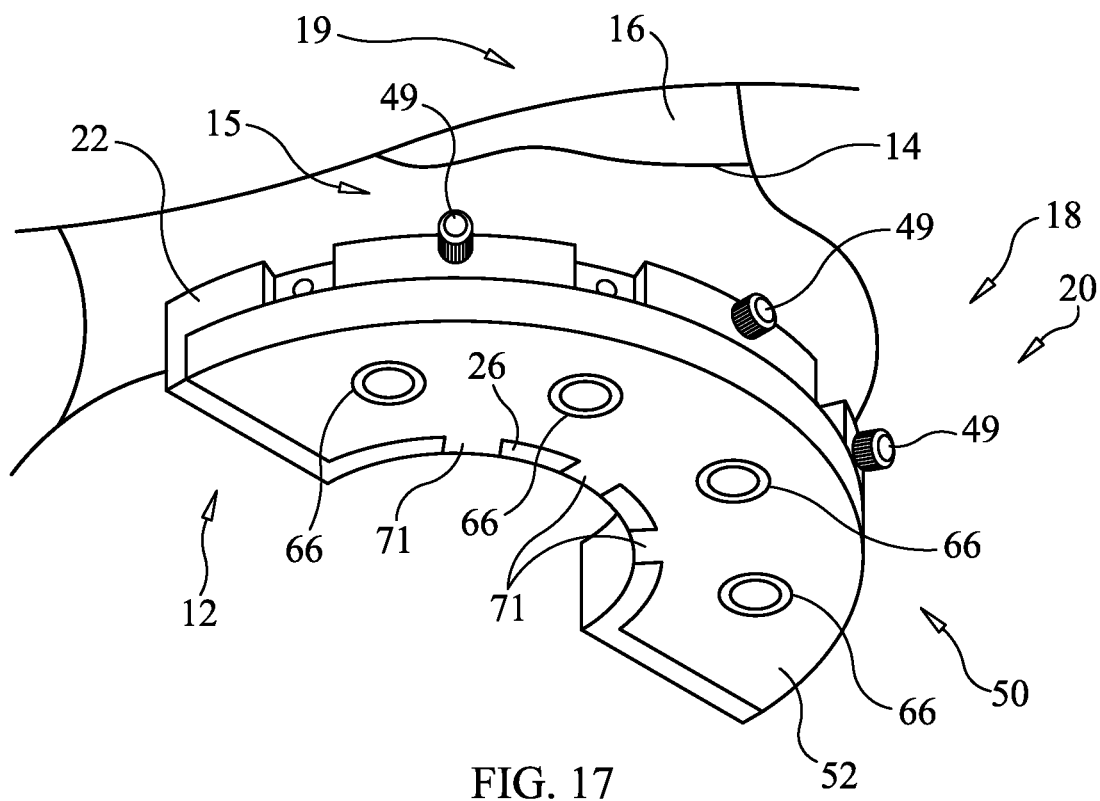
FIG. 17 is substantially an underside perspective view of the combination bone foundation guide and dental implant surgical guide combination.
Figure 18:
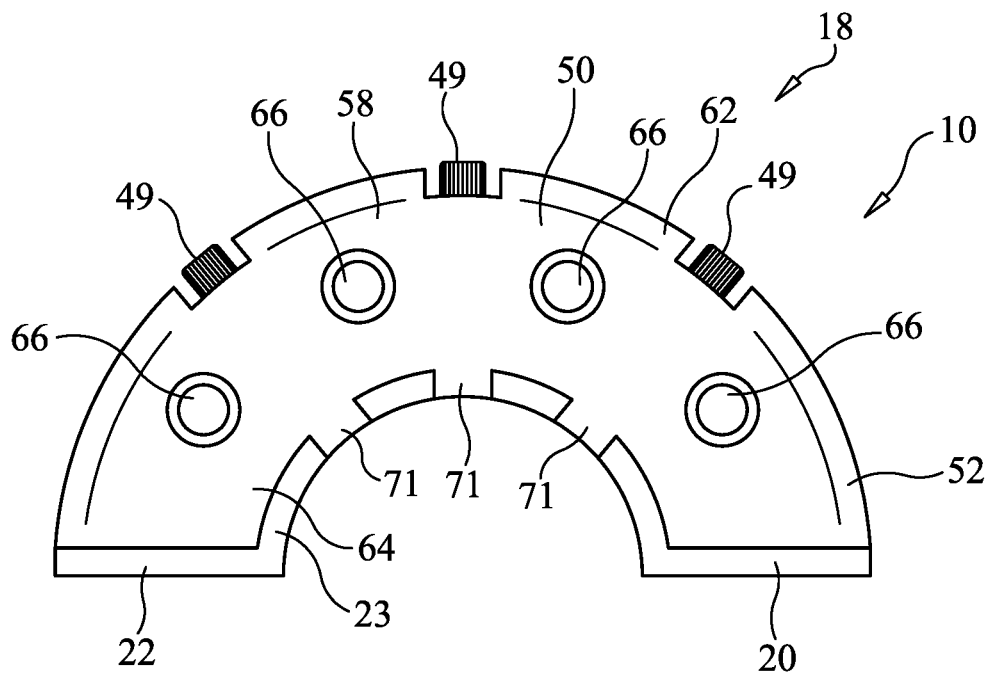
FIG. 18 is substantially an underside elevation view of the combination bone foundation guide and dental implant surgical guide combination.
Figure 19:
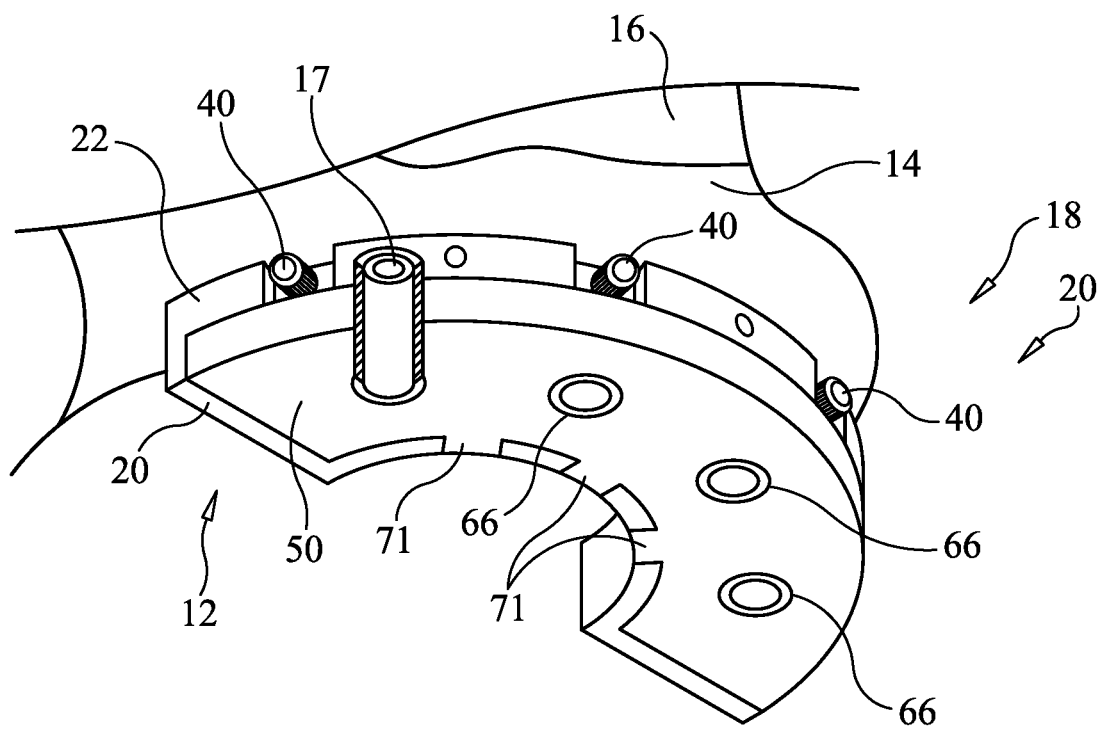
FIG. 19 is substantially a cutaway, perspective view of the combination bone foundation guide and dental implant surgical guide combination.
Figure 20:
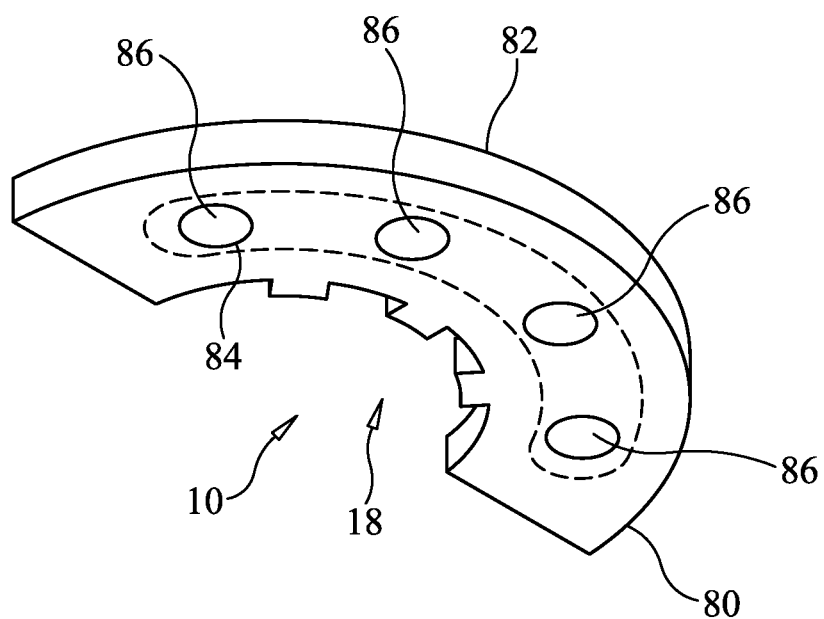
FIG. 20 is substantially a perspective view of the tissue spacer gasket.
Figure 21:
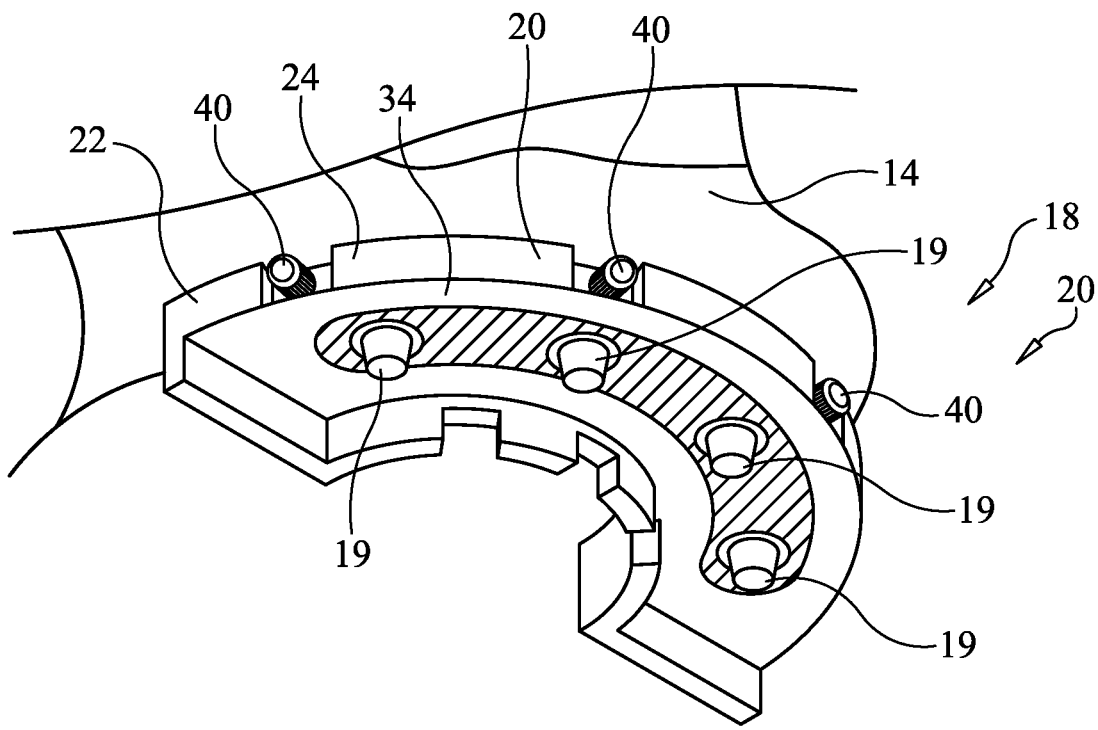
FIG. 21 is substantially a perspective view of the bone foundation guide with abutments attached to the implants.
Figure 22:
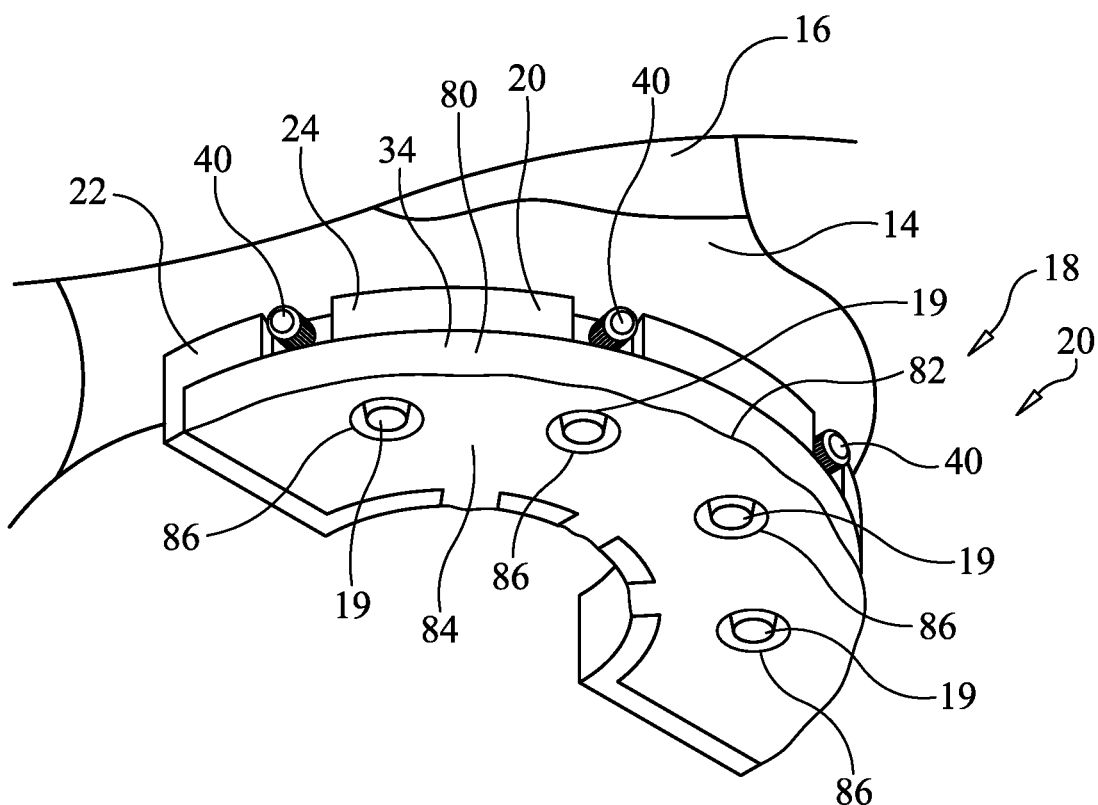
FIG. 22 is substantially a perspective view of the bone foundation guide and tissue gasket combination.
Figure 23:
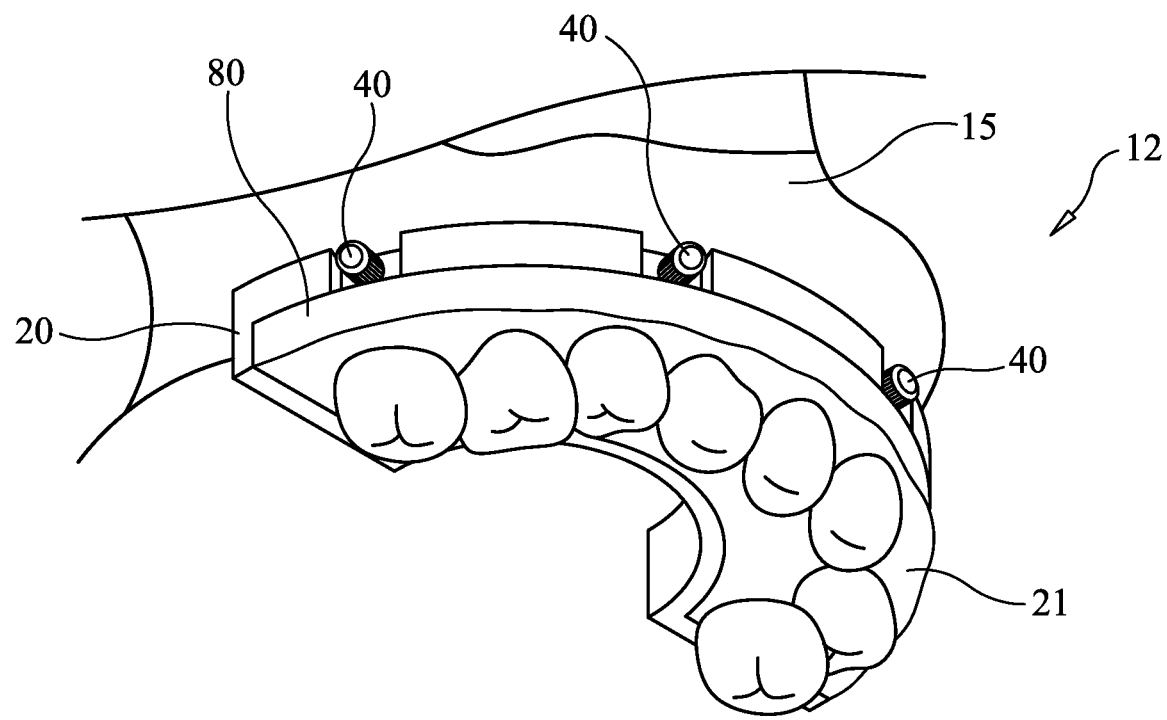
FIG. 23 is substantially a perspective view of the prosthesis applied to the bone foundation guide and tissue gasket combination.
Figure 24:
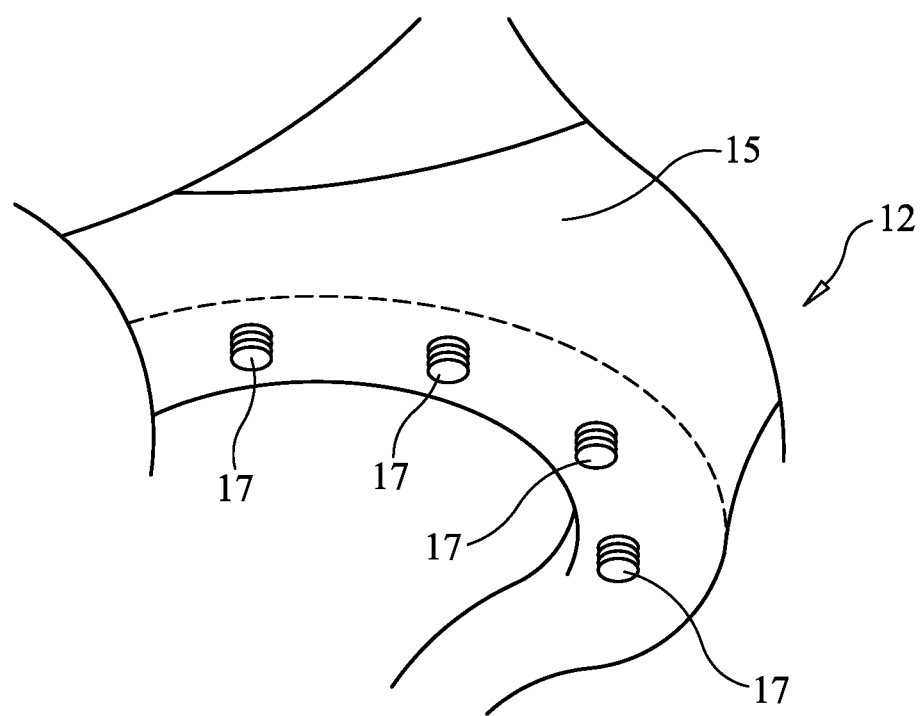
FIG. 24 is substantially a perspective view of the dental surgical site with the bone foundation guide, tissue gasket and prosthesis removed.
Figure 25:
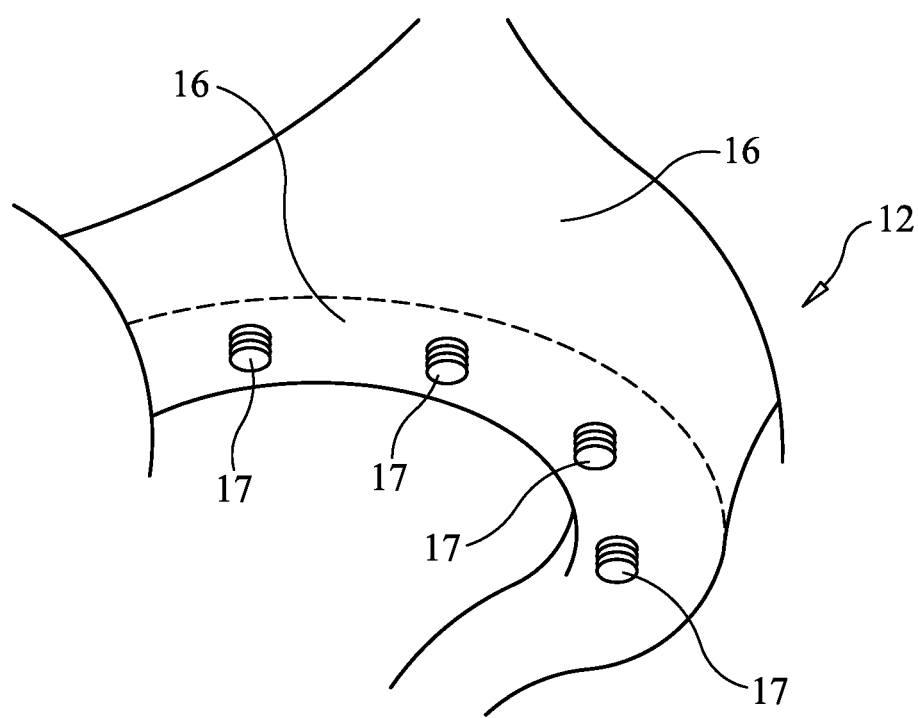
FIG. 25 is substantially a perspective view of the dental surgical site with the bone foundation guide, tissue gasket and prosthesis removed and gum tissue sutured back into place at the dental surgical site.
Figure 26:
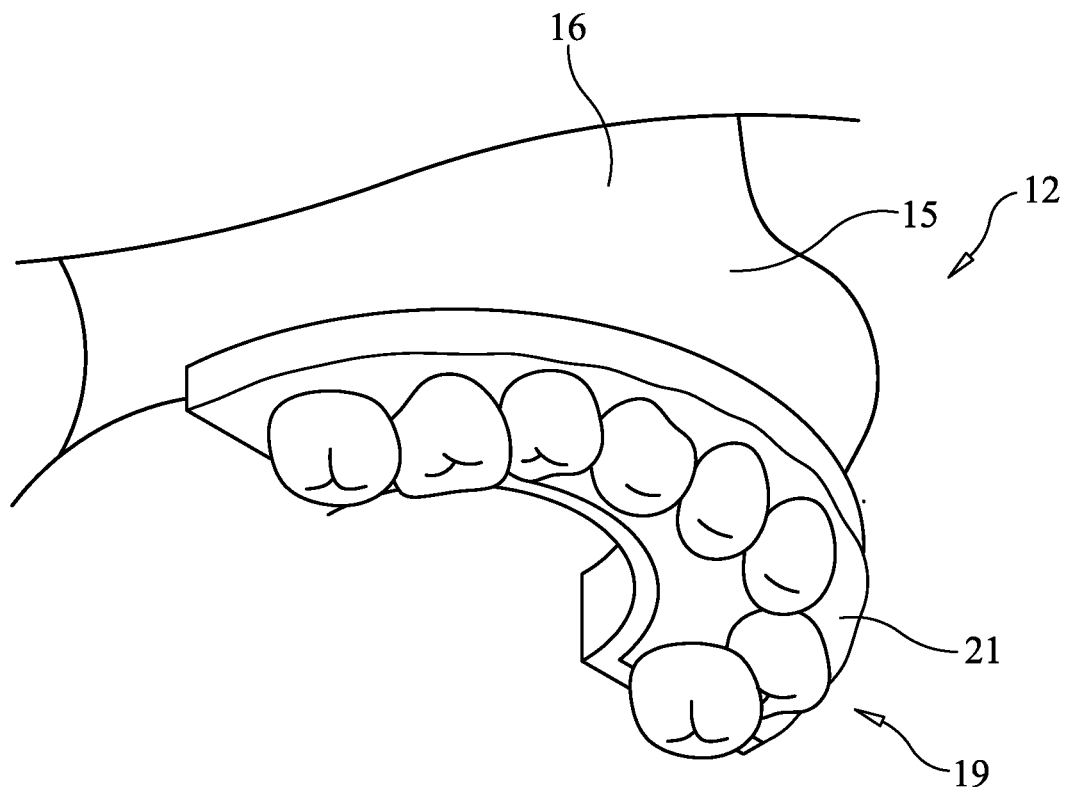
FIG. 26 is substantially a perspective view of the dental surgical site with gum tissue sutured back into place and prosthesis relocated upon the implants.

The present invention 10 could be a bone foundation guide system 18 and method or process 100. As substantially shown in FIGS. 1, 17, and 19 the bone foundation guide system 18 could comprise a bone foundation guide 20, a dental implant surgical guide 50 and in at least one embodiment, a tissue spacing gasket 80 as well. The bone foundation guide body 22, the dental implant surgical guide 50 and tissue spacing gasket 80 may be designed and created together through digital dentistry in which scans of the patient's mouth 35 (along with impressions and castings thereof) may be used to create a virtual model (not shown) of the patient's existing mouth; to develop a virtual model of the patient's mouth both pre-dental and post-dental surgery; and to develop a dental surgical plan that connects the two patient-specific virtual models. In this manner, the dental surgical planning can provide for the manufacture the bone foundation guide 20, dental implant surgical guide 50 and tissue spacing gasket 80 so that the contours of the bone foundation guide body 22 may be created to fit upon the exposed bone 14 of the dental surgical site 12. Further, the dental implant surgical guide 50 contours may also match those of the dental implant surgical guide 50 and the tissue spacing gasket 80 to enable dental implant surgical guide 50 and the tissue spacing gasket 80 to alternately be removably attached to and be supported by the bone foundation guide 20.

As substantially shown in FIGS. 1, 2, 3, 4, 5 and 6 the bone foundation guide 20, as substantially used by a dental healthcare professional such as a dental surgeon (not shown) to substantially modify (e.g., reduce, augment or both) the bone 14 of the dental surgical site 12 as needed for a successful dental surgery. The bone foundation guide 20 could comprise a bone foundation guide body 22 with a buccal wall 24 and lingual wall 26 connected together at their respective ends by a first end 28 and a second end 30. The first end 28 and the second end 30 could be holding the buccal and lingual walls 24, 26 apart from one and other in a substantially parallel fashion to generally create and define an open surgical space 32 (e.g., that generally passes through the bone foundation guide body 22) to generally continuously connect a portion of the top 34 of the body 22 with a portion of the bottom 36 of the body 22.

Figure 13:
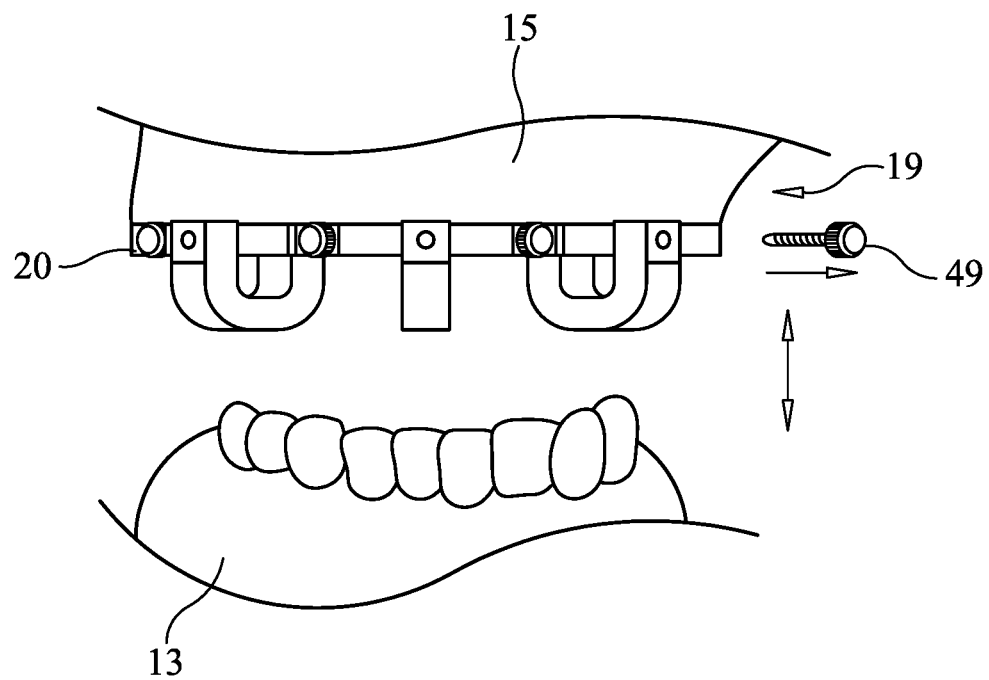
FIG. 13 is substantially a front perspective view of the bone foundation guide with struts, the strut fasteners being removed from the respective strut.
Figure 14:
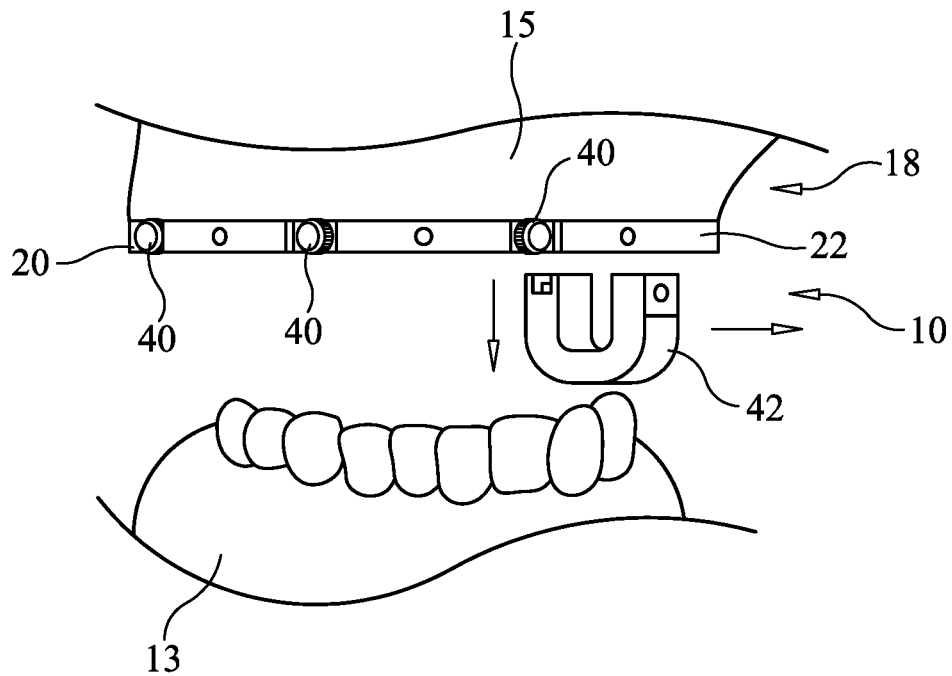
FIG. 14 is substantially a front perspective view of the bone foundation guide with struts, the strut being removed the bone foundation guide body.
Figure 15:
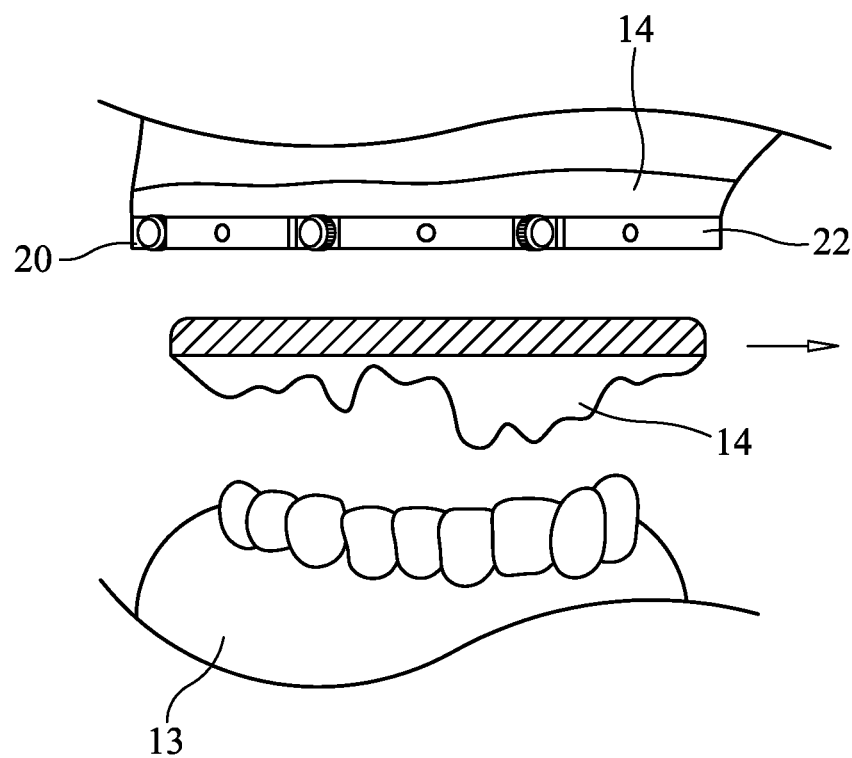
FIG. 15 is substantially a front perspective view of the bone foundation guide with struts removed and the harvested bone being removed from the dental surgical site.
Figure 15A:
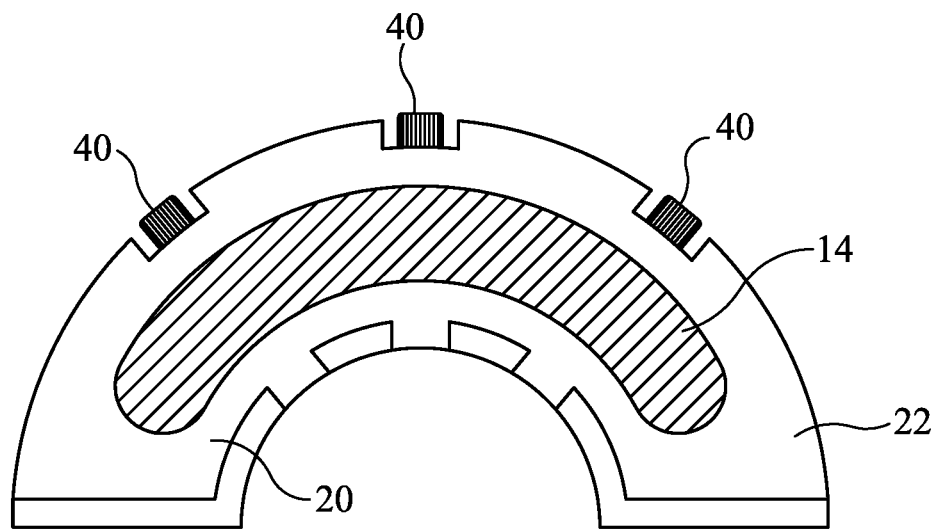
FIG. 15A is substantially a bottom elevation view of the bone foundation guide with struts and the harvested bone removed from the dental surgical site.
Figure 16:
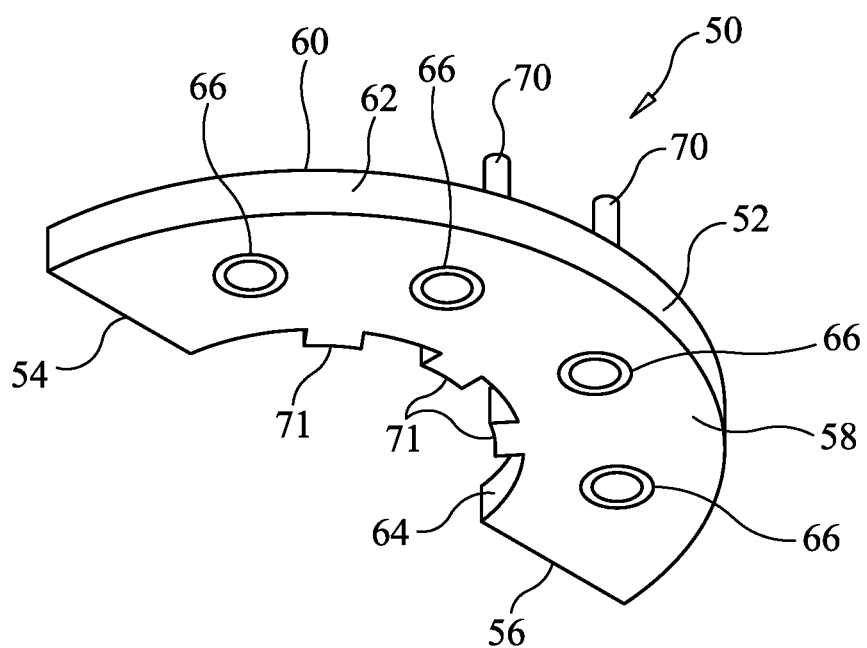
FIG. 16 is substantially an underside elevation view of the bone foundation guide with struts removed and the harvested bone removed from the dental surgical site

The bone foundation guide body 22 may be further penetrated by one or more attachment apertures 38 that may be oriented to pass through a buccal 24 wall. Body fasteners 40 may pass through the attachment apertures 38 to into the bone 14 of the dental surgical site 12 to removably secure the bone foundation guide body 22 to dental surgical site 12. (Substantially shown in FIG. 13.) The attachment aperture 38 could further feature a reinforcement collar (not shown) to support and guide the fastener 40 through the attachment aperture 38. In other embodiments, the attachment apertures 38 could pass though the body 22 connecting top 34 and bottom 36 or through the lingual wall 26 to provide body attachment to the dental surgical site 12. The body may further have a cutting guard 23 extending up from the top of the lingual wall 26 to prevent a cutting implement (not shown) when used with the bone foundation guide in removing bone 14 from a dental surgical site from unwantedly cutting the tongue or other portions of the patient's mouth 19. This cutting guard 23 may further feature out or more cutouts 25 that may be used to anchor and align other portions.

Some embodiments of the bone foundation guide body 22 may further comprise of a one or more anchoring struts 42 that may be removably attached to the buccal wall 24 and the lingual wall 26 between the first end 28 and the second end 30. The anchoring strut 42 may have at its outer apex 44 one or more indentations 46 that can match one or more portions of gum, dentition or both the patient's first or opposing alveolar ridge 13 (e.g., the opposing alveolar ridge 13 is located opposite of or opposing to the second alveolar ridge 15 that is supporting the dental surgical site 12. Meaning if the dental surgical site 12 is on the upper alveolar ridge then the opposing alveolar ridge 13 could be the lower alveolar ridge.) The front end 43 of anchoring struts 42 may be penetrated by strut apertures 47 that allow strut fasteners 49 (e.g., tapered pins) to penetrate through the anchoring strut 42 to the buccal wall 24. The strut fasteners 49 may removably attach to the anchoring strut 42 by the buccal wall 24 and be held in place by frictional force. The other or rear end 41 of the anchoring strut 42 may have a strut groove 48 that fits over a respective cutout 25. A tab 45 within the strut groove 48 may be removably received within the respective cutout 25 to further reversibly attach the rear end 41 to the cutting guard 23.

The anchoring strut 42 may allow the patient itself press at least a portion of gum tissue, dentition or both of the opposing alveolar ridge 13 upon at least one anchoring strut 42 of the bone foundation guide 20 to generally hold the bone foundation guide 20 in place upon the dental surgical site 12 (e.g., the exposed bone.) In particular, that portion of gum tissue, dentition or both of the opposing alveolar ridge 13 could be received with the indentation(s) 46. The patient's action (e.g., substantially clamping down with patient's mouth upon the bone foundation guide 20 in situ could allow the patient to temporarily and removably hold the bone foundation dental upon the dental surgical site while the dental health care professional (not shown) is free to use both hands to attach the bone foundation guide 20 in place with body fasteners. Once the bone foundation guide 201 is secured by body fasteners 40 to the bone portion of the dental implant surgical site 12, the patient could remove one or more portions of the opposing alveolar ridge 13 from the one or more indentations 46 upon the one or more anchoring struts 42 (e.g., the patient opens its mouth to stop biting upon the anchoring struts 42.) The dental health care professional can then proceed with the removal of the strut fasteners 49 from the bone foundation guide 20 so as to be able to lift the anchoring struts 46 free and clear from the body 22.

The use of anchoring struts 42 can also be applied to bone reduction guides that lack the present inventions ability to combine or stack together with the dental implant surgical guide or tissue spacing gasket. In such instances, bone reduction guides are not contoured to accept the dental implant surgical guide or tissue spacing gasket but could have a body to which the anchoring struts 42 are applied to allow the patient to substantially clamping down with patient's mouth upon the bone reduction guide in situ could allow the patient to temporarily and removably hold the bone reduction guide upon the dental surgical site. The portions of dentition, teeth or both of the opposing alveolar ridge could be received with the impressions located upon the apex of anchoring struts 42 to hold the bone reduction guide in place while the dental health care professional (not shown) is free to use both hands to attach the bone reduction guide in place with fasteners to the dental surgical site. Once the fasteners have secure the bone reduction guide to the dental surgical site, the patient could release its bite upon the anchoring struts. The dental healthcare professional can then remove the anchoring struts 42 from the body of the bone reduction guide to allow the bone reduction guide to be used to alter bone structure at the dental surgical site.

As substantially shown in FIGS. 16, 17, 18, and 19 once the anchoring strut(s) 42 are removed from the bone foundation guide body 22, the dental implant surgical guide 50 could be removably attached to the top 34 of the body 22. The dental implant surgical guide 50 could be so anchored to dental surgical site 12 to generally allow dental implant surgical guide 50 to be substantially be used to guide and locate the placement of dental implants within dental surgical site 12.

As substantially shown in FIGS. 34 to 42, one possible embodiment of the invention 10 could further comprise a double open-ended placement channel 316 for guiding the creation (through use of drill bits 400 of increasing diameters) of an implant channel 302 from the patient's mouth 19 to a dental implant anchor site 304 remote from the patient's mouth 19. The placement channel 300 could pass through a plurality of tandemly aligned, guiding cylinders 320 (e.g., a master tube 322, a drill key 324, a drill key 324 as held into a master tube 322) as held by a first combination 346 of the bone foundation guide 20 and dental implant surgical guide 50 (e.g., artificial guide structures) Depending on various skull structures (e.g., the bone and sinus) through which the implant channel 318 may pass (or may not) through, the implant channel 318 may be seen as being either continuous or non-continuous. A terminal end of the created implant channel 318 at the remote anchoring site 304 could serve to direct the final movement of the remote anchored implant 300, 302 into the desired area of the remote anchoring site 304.

The placement channel 316 in substantially encompassing several guiding cylinders 320 tandemly aligned together could provide greater delivery precision and accuracy than a placement channel 316 having only a single guiding cylinder 320 (e.g., as supported by the dental implant surgical guide 50 overlaying a bone foundation guide, a single guiding cylinder 320 then only being aligned only with the much wider open surgical space 32 as formed by the bone foundation guide 20.) Such a lengthened placement channel 316 with multiple tandemly aligned guiding cylinders 320 could be seen, by very rough analogy, in increasing a length of a firearm barrel and the firearm barrel's respective aiming sight radius to generally increase the firearm barrel's delivery precision of projectile to a target.

As substantially shown FIGS. 34, 35, 36 and 37, the placement channel 316 could comprise a double open-ended first implant channel portion 330 and a double open-ended second implant channel portion 338 connected together in tandem alignment. The bone foundation guide 22 could form the first placement channel portion 330 that penetrates the bone foundation guide 20 and passing through at least one guiding cylinder 320 while the dental implant surgical guide 50 could form a second placement channel portion 338 that penetrates the dental implant surgical guide 50 by passing through another guiding cylinder 320. In one possible embodiment, the placement channel 300 may be created when the bone foundation guide body 22 and the dental implant surgical guide 50 (e.g., two artificial structures) are then substantially placed together to form the first combination 346.

Figure 35:
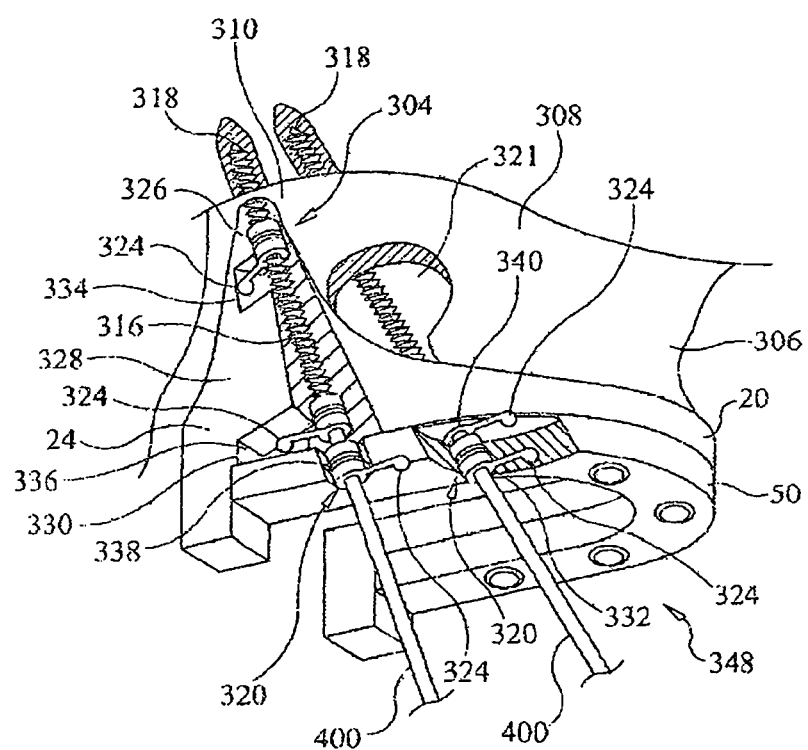
FIG. 35 is substantially showing a cutaway perceptive view of another embodiment of the bone foundation guide and dental implant surgical guide combination forming placement and implant channels with dental drill bits in place.
Figure 36:
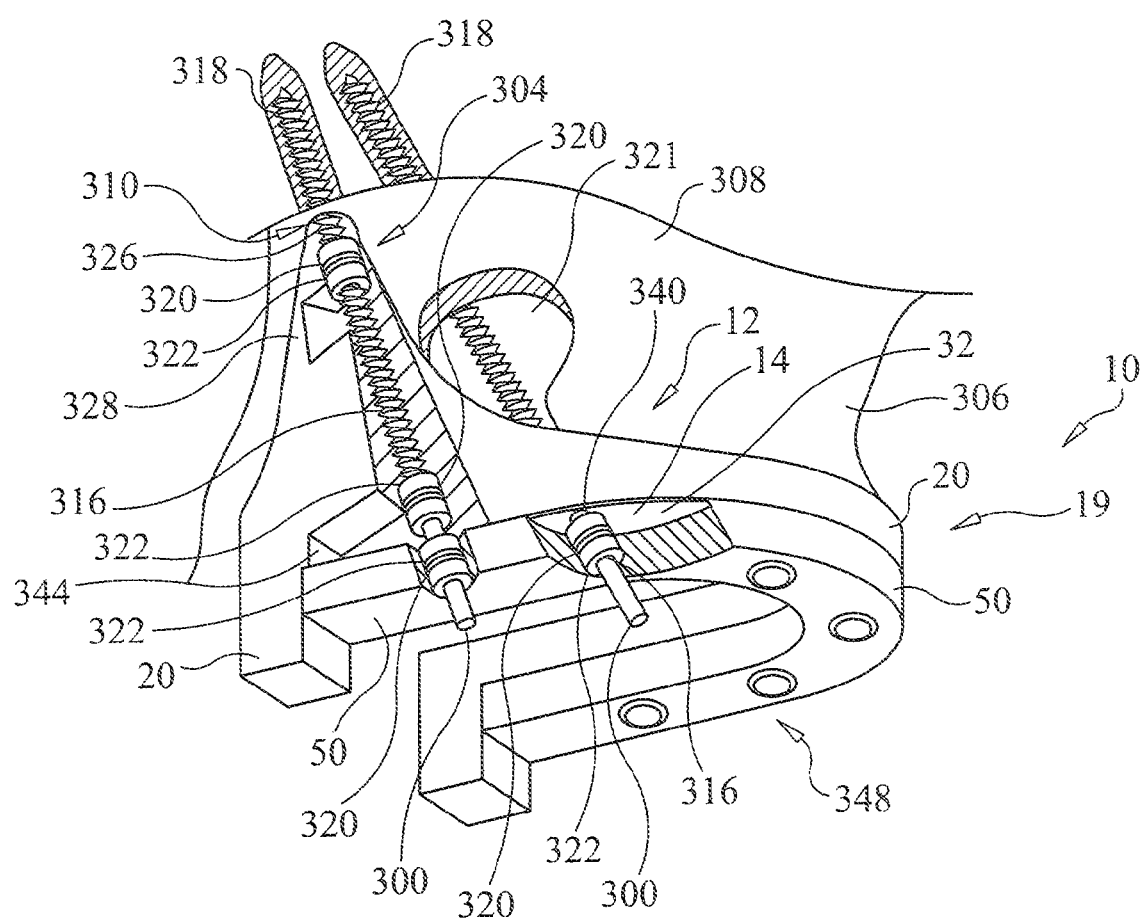
FIG. 36 is substantially showing a cutaway perceptive view of another embodiment of the bone foundation guide and dental implant surgical guide combination forming placement and implant channels with zygomatic implants in place.
Figure 36A:
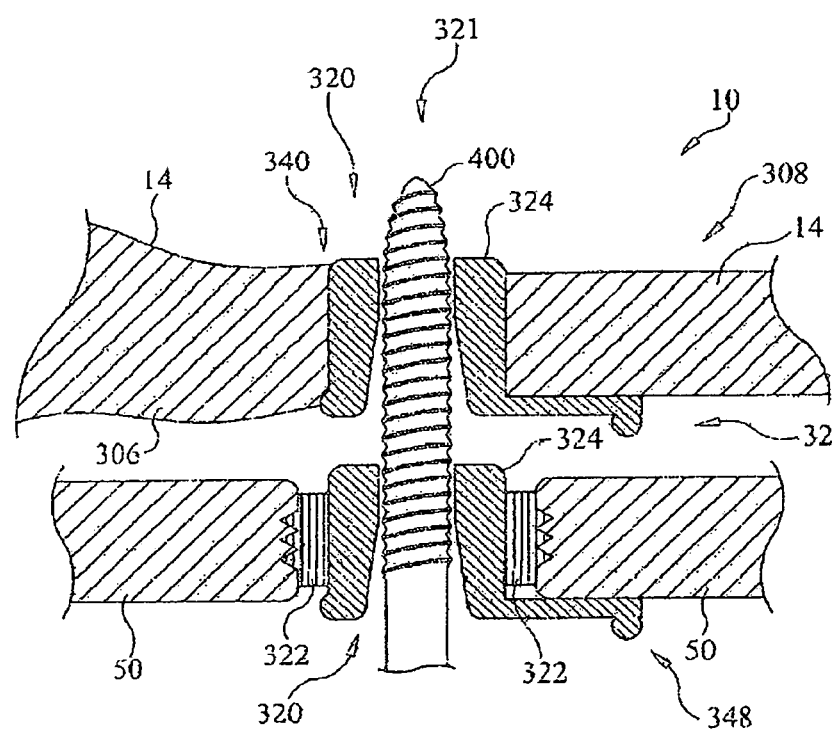
FIG. 36A is substantially showing a cutaway elevation view of the penetrating aperture with a guiding cylinder in place.

As substantially shown in FIGS. 35, 36 and 36A, the combination 346 could form another placement channel 320 with at least one guiding cylinder 320 (e.g., the dental implant surgical guide 50 having at least one guiding cylinder only initially aligned with a much wider open surgical space 32; the bone foundation guide 20 having instead the guiding cylinder 320 that is not tandemly aligned with a guiding cylinder 320 of the dental implant surgical guide 50) being placed over the penetrating aperture 340 substantially drilled in the exposed bone of the posterior maxilla 308, the penetrating aperture 340 connecting the outside surface of the exposed bone to the maxillary sinus cavity 321 found above the posterior maxilla 308 (e.g., a natural structure.) The penetrating aperture 340 could removably hold the dental key drill 324 generally forming a guiding cylinder 320. In tandemly aligning the at least one guide cylinder 320 of the combination with the penetrating aperture 340 holding the dental drill key 324, the placement channel 316 could then be encompassing multiple, tandemly aligned guiding cylinders 320, an first combination 346 that is augmented to form a second combination 348.

As substantially shown in FIGS. 34, 35, 36, and 40, one version of the bone foundation guide 20 could comprise a finger projection 328 substantially descending from the bottom 36 (e.g., of the buccal wall 24). When the bone foundation guide 20 is placed upon the dental surgical site 12 with exposed bone, the gum being moved away from the underside of the zygomatic bone 310, a remote implant anchoring site 304, the finger projection 328 could come to rest against the underside of the zygomatic bone 310. The bone foundation guide's placement channel portion 330 could connect an opening on a tip 326 of the finger projection 328 to another opening on the top 34 of the buccal wall 24. The tip opening could direct the drill bit 400 moving out of the placement channel 316 directly against the desired position of the remote implant anchoring site 304 (underside of the zygomatic bone 310.) The tip 326 could further support one guiding cylinder 320 while the buccal wall 24 of the bone foundation guide 20 could support another second guiding cylinder 320 proximate to the top 34 of the bone foundation guide 20, the two said guiding cylinders 320 being in tandem alignment with each other. The placement channel portion 330 could run through both guiding cylinders 320 to continuously connecting tip opening to a top opening. When combined with the bone foundation guide 20, the dental implant surgical guide 50 could orient the second placement channel portion 338 holding a third guiding cylinder 320 in tandem alignment with the other two guiding cylinders 320 as held by the bone foundation guide 20 to generally form the overall placement channel 316.

To facilitate the placement of drill keys 324 in the respective guiding cylinders 320 (e.g., master tubes 322), the bone foundation guide may further form a window 334, indentation 336 or both. The window 334 could be formed by the finger projection's tip 326 may expose one open end of one master tube 322 of the guiding cylinder 320 as housed by the tip 332. The drill key 324 could be inserted into the window 334 to allow the drill key 324 to be connected to the one open end of the one master tube 322. The indentation 336 could be formed along a portion of an edge substantially formed by the meeting of the bone foundation guide's top 34 and sides (e.g., buccal wall 24, lingual wall 26, first end 28, second end 30) to allow the placement of the drill key 324 directly into the master tube 322 situated by the top 34 and to further accommodate a handle 352 of the drill key 324.

As substantially shown in FIGS. 35, 36, and 36A, the invention 10 may augment the first combination 346 with a natural guide structure to establish the multiple guiding cylinders 320 in spaced-apart, tandem-alignment forming the placement channel 316. The need for this combination 348 may occur when the patient may not be able to easily accommodate (e.g., open their mouth wide enough) drilling equipment that is needed to be placed at the rear of the mouth 19. Further, the second combination of the dental implant surgical guide 20 and bone foundation guide 50 combination 348 may have the dental implant surgical guide's guiding cylinder 320 aimed at the open surgical space 32 (e.g., the combination's initial formation of the placement channel 316 at that point only has one guiding cylinder 320.) Such situations may require a natural guide structure such as the exposed bone 14 of posterior maxilla 308 that has been drilled (e.g., using a drill bit 400 as substantially directed by the combination 346 or alike) to produce a penetrating aperture 340. The resulting diameter of the penetrating aperture 340 should tightly but removably accommodate the drill key 324 generally forming a guiding cylinder 320.

Figure 37:
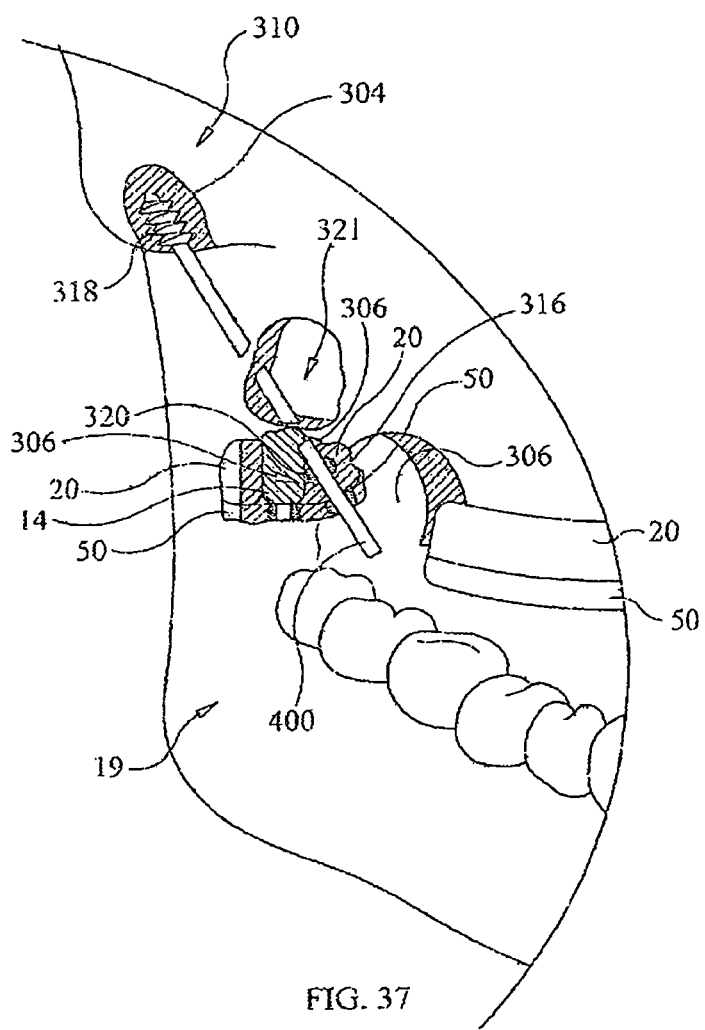
FIG. 37 is substantially showing a cutaway perceptive view of yet another embodiment of the bone foundation guide and dental implant surgical guide combination forming placement channel on the lingual side of the combination.

As substantially shown in FIG. 37, another version of the bone foundation guide 20 may not have the finger projection 328 and may just have at least one guiding cylinder 320 (e.g., master tube 322) located in the main portion of the body 22 (e.g., the lingual wall 26, 22 buccal wall 24, first end 28, second end 30 or the like) through which the first placement channel portion 330 could pass (e.g., continuously connecting the top 34 and bottom 36 of the bone foundation guide 20.) This version could form an indentation 336 when the combination 346, 348 is formed to accommodate the swapping of drill keys 324 to the master tube 322 held by the body 22.

Similarly, the dental implant surgical guide 50 could support at least one guiding cylinder 322 dedicated to form a second placement channel portion 338. Upon the combination 346 being formed, the second placement channel portion 338 could align with the first placement channel 330 to generally create the placement channel 316. In one version, the second placement channel portion 338 could pass through the second guiding cylinder 320 to substantially connect the dental implant surgical guide's top and bottom sides 58 60. In other versions, the second placement channel 338 passing through the at least one guiding cylinder 322 could be in a canted orientation to generally continuously connect a side (e.g., lingual side 64, buccal side 62 or the like) to the top side 58 or bottom side 60. In such situations, the first channel portion 336 could also be in a canted orientation to tandemly align up with the second channel portion 338.

Utilizing the invention 10 to create the implant channel 318 such as for the zygomatic dental implant, a more common version of the implant channel 318 could start in the mouth 19 to penetrate though the posterior maxilla 308 and the maxillary sinus cavity 321 so that the mid-section or mid-portion of the zygomatic dental implant 300 passing through the implant channel 318 could be outside of the skull's bone and sinus structure to be otherwise covered by the facial tissue and muscle until the zygomatic dental implant 300 terminates into the remote implant site 304 (e.g., zygomatic bone 310.) In another version, the implant channel 318 penetrates the posterior maxilla 308, the maxillary sinus 321 and other skull bone and sinus structures as the implant channel 318 penetrates the remote implant site 304. The zygomatic implant 300 could be encased in skull bone and sinus structure with the exception of the prosthesis attachment end. In yet another implant channel version, the zygomatic dental implant 300 after attaching to the remote implant attachment site 304 generally moves outside the remaining skull bone and sinus structure generally to be covered by muscle and facial tissue except where the zygomatic dental implant 300 enters the mouth 19 to substantially locate the exposed prosthesis attachment end by the posterior maxilla 308.

Figure 38:
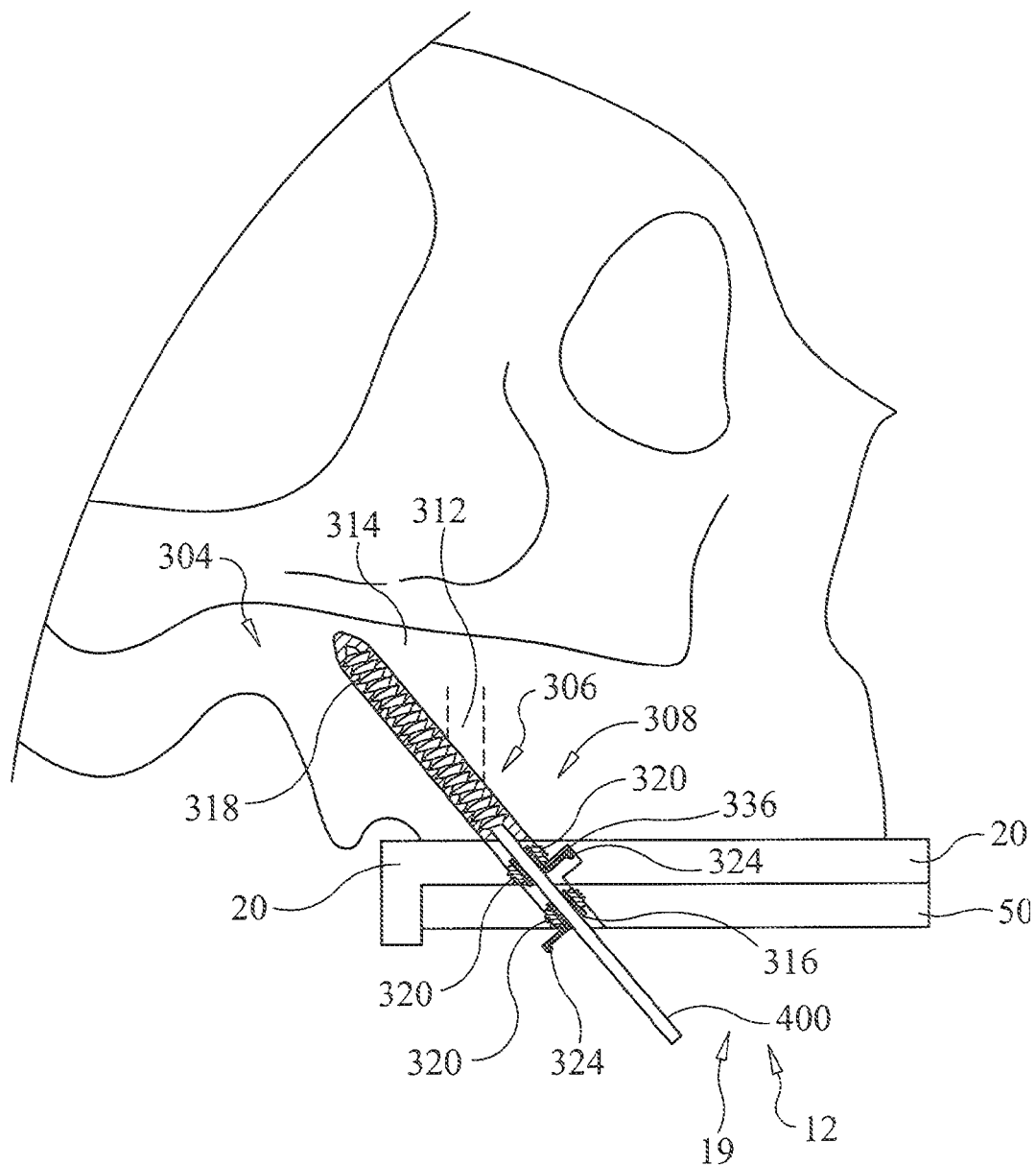
FIG. 38 is substantially showing a cutaway side elevation view of an embodiment of the bone foundation guide and dental implant surgical guide combination for a pterygoid dental implant with dental drill in place.
Figure 39:
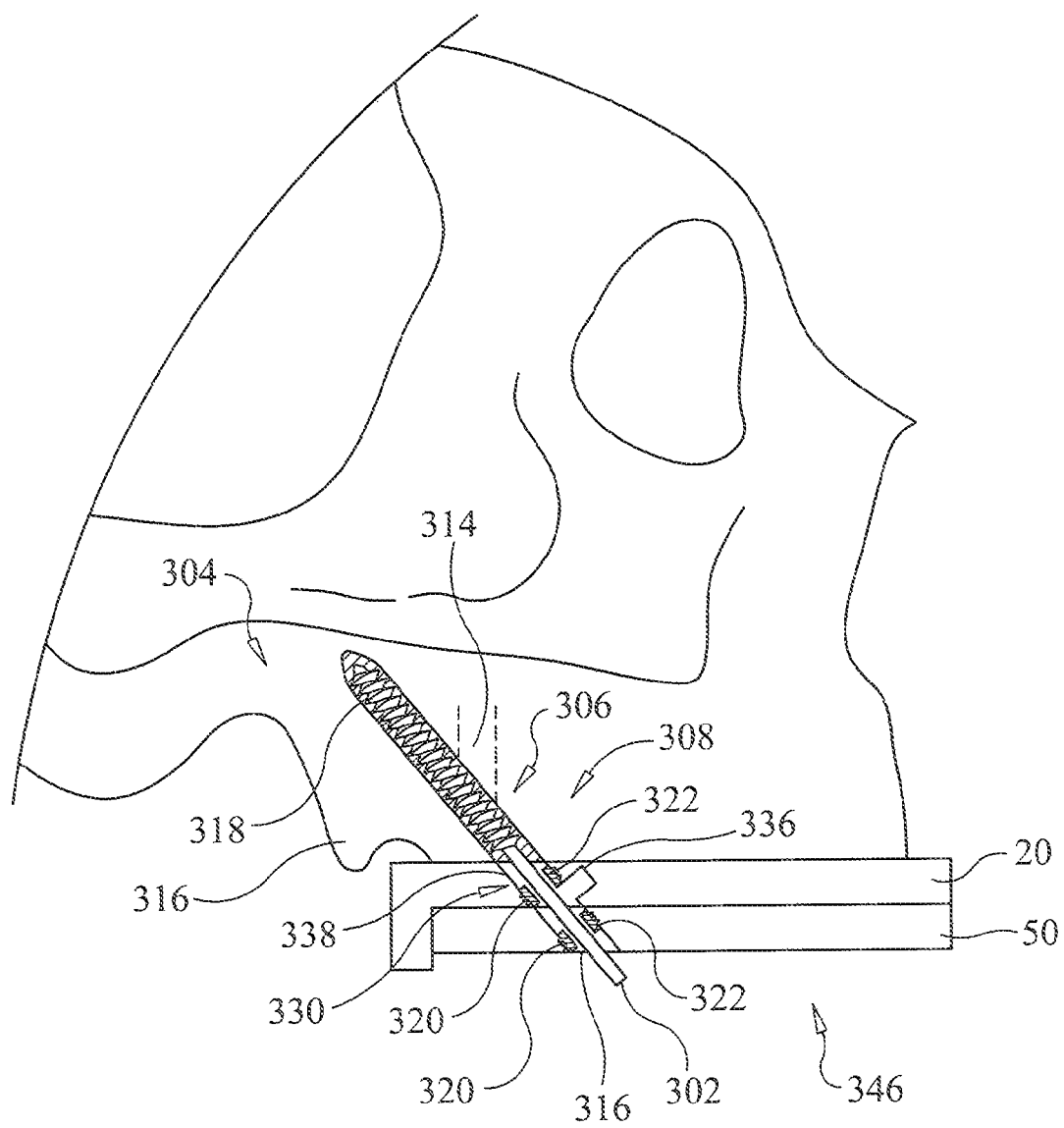
FIG. 39 is substantially showing a cutaway side elevation view of an embodiment of the bone foundation guide and dental implant surgical guide combination for a pterygoid dental implant with pterygoid dental implant in place.

As substantially shown in FIGS. 38 and 39, the combination could form a placement channel 316 that could direct a dental drill bit 400 to form the implant channel 318 (e.g., for the pterygoid dental implant 302) to pass into the posterior maxilla 308; through a maxillary tuberosity 312 (e.g., substantially located up from and behind the rear end of the posterior maxilla 308) to substantially terminate in the remote anchoring site 304 at a pterygoid plate 314 (e.g., substantially located adjacent to the back of the maxillary tuberosity 312.) As such, much of the pterygoid dental implant 302 as placed into the created implant channel 318 may be engaged by skull bone structure with the general exception of the pterygoid dental implant's prosthesis attaching end.

The placement and anchoring of the remote dental implants 300, 302 may depend on several factors generally including but not necessarily limited to: specific anchor site size, location, width and alike; the amount of particular posterior maxilla bone available; and the upper jaw recession. These factors may further influence the configuration, position, orientation of the combination 346, 348 as well as that of the placement channel 316, implant channel 318 and the remote dental implant.

Figure 40:
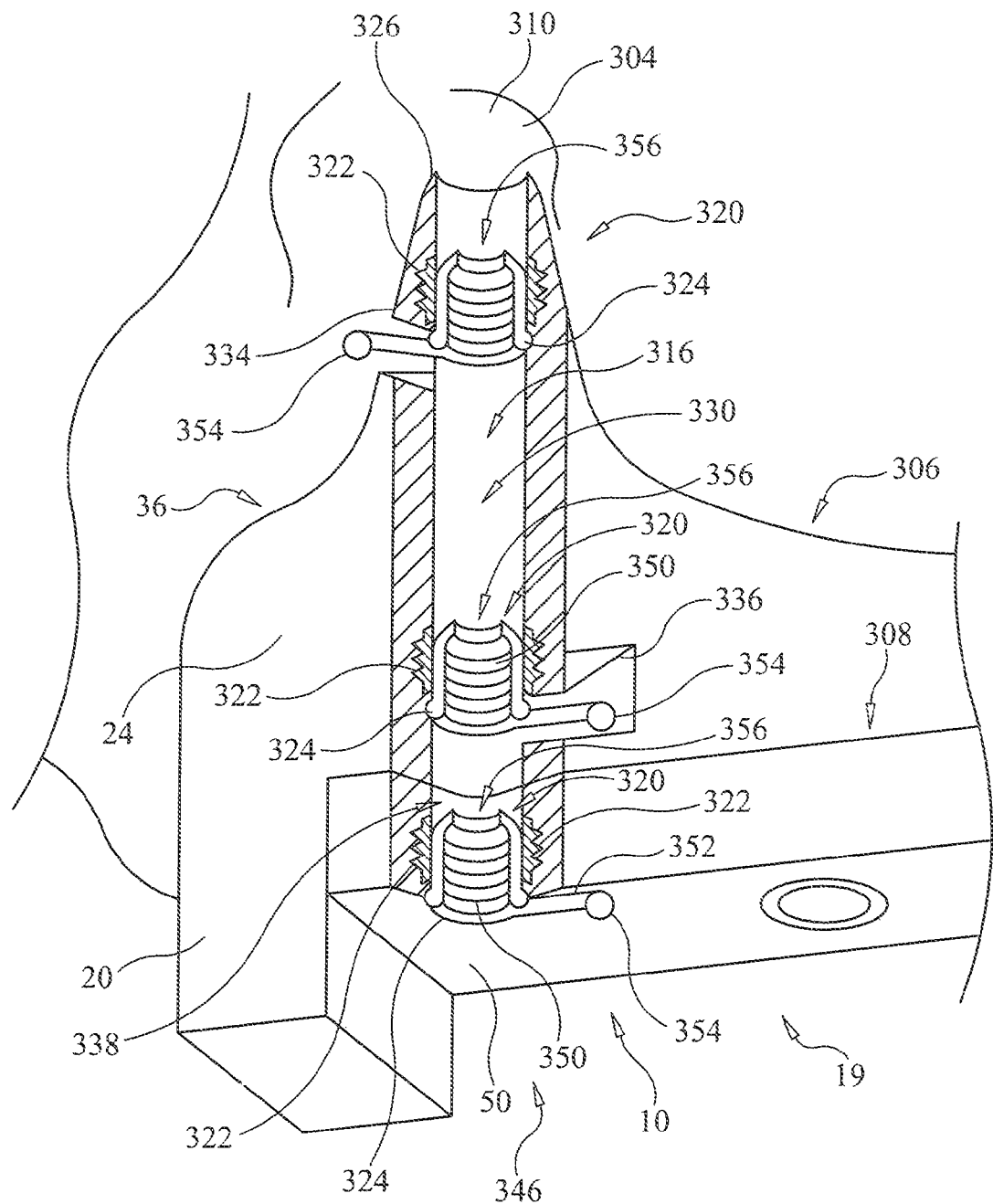
FIG. 40 is substantially showing a cutaway perceptive view of one embodiment of a combination with finger projection showing the placement channel with the drill keys in master tubes.
Figure 41:
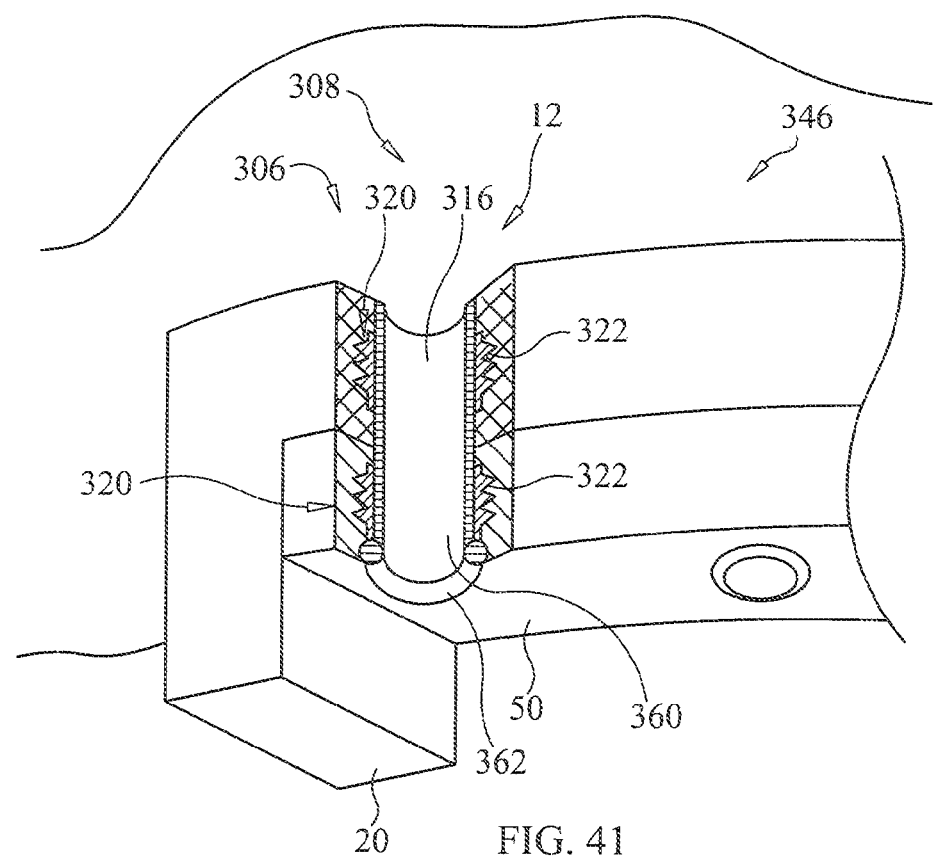
FIG. 41 is substantially showing a perspective view of one embodiment of combination using knurled end tub instead of drill key in master tubes.
Figure 42:
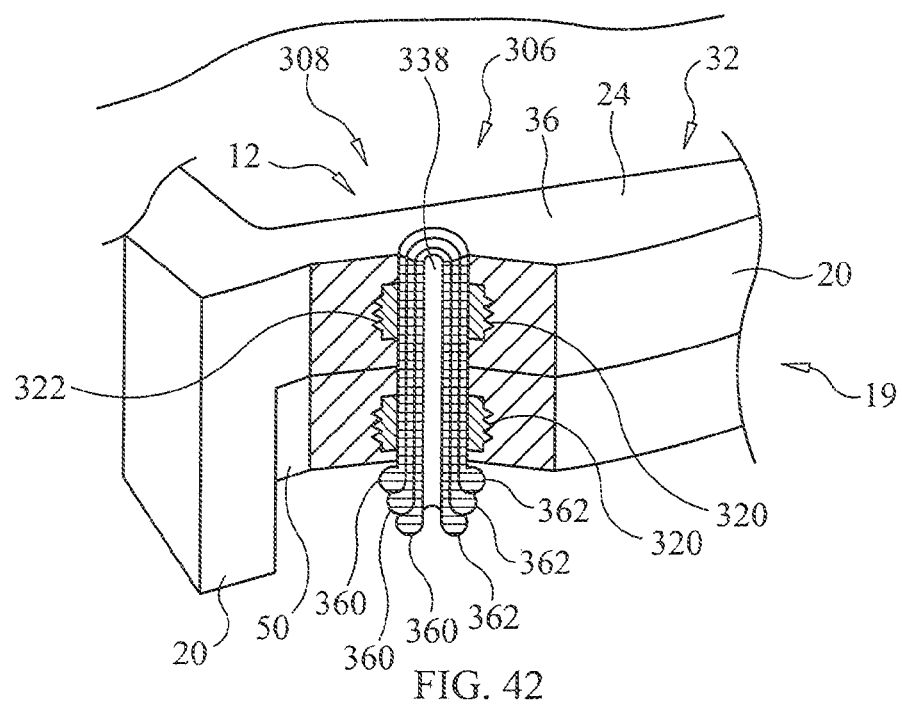
FIG. 42 is substantially showing a perspective view of another embodiment of combination using a nestled set of knurled end tubes.

As substantially shown in FIGS. 40, 41, and 42 the master tubes 322 and dental drill keys could be made from suitable materials such steel, titanium or the like to resist the cutting action of dental drill bits 400 passing through the guide cylinders 320. The master tubes 322 could be double open-ended cylinders with precision-made interior diameters that could allow the controlled passage of a suitable dental implant, the acceptance of dental drill keys 324 and alike. The exterior of the master tubes 322 could be ridged or the like to allow the securement of the master tubes 322 within a body of a guide 20, 50.

The drill key 324, which could be commonly found as a part of a dental implant kit (not shown), could comprise a drill cup 350 attached by the drill cup's rim to a handle 352. The drill cup 350 in the center could have form a drill aperture 352 that receives a specific diameter drill bit 400 from a set of drill bits 400 of increasing sized diameters as used in the formed placement channel 316 to create the implant channel 318. The drill cup's size allows it to be removably accepted in a snug manner by the master tube 322 or the penetrating aperture 340. An unattached handle end could further feature a ball 354 that an operator (not shown) could grasp to more easily manipulate the dental drill key 324.

A set of dental drill keys 324 could be assigned to each guiding cylinder 320 of a formed placement channel 316. The dental drill key 324 of each dental drill key set having the smallest diameter drill aperture 356 could be inserted into a respective master tube 322, penetrating aperture 340, or both. The dental drill bit 400, suitably attached to a dental drill (not shown), could be introduced into the placement channel 316 and through the dental drill keys (as attached to the master tube[s]/penetrating aperture[s]) to drill out and create the initial opening in the skull structure for the implant channel 318. Once the initial opening is substantially created, the drill bit 400 can be removed from the placement channel 316. The initial drill keys can then be swapped out from the respective master tube(s), penetrating aperture(s) or both for the next increased sized drill aperture dental drill keys 324. Accordingly, the next larger diameter drill bit 400 from the drill bit set is then driven through the placement channel 316 to increase the size (e.g., diameter) of the initial opening of the implant channel 318. This process could be repeated until the largest sized dental drill bit 400 and largest drill aperture diameter dental drill keys 324 have been used in the implant channel creation.

As substantially shown in FIGS. 36, 37 and 39, the drill keys and alike having been removed from the placement channel 316, the remote dental implant 300, 302 can then be moved through the implant channel 318. The interior diameters of the placement channel's master tube(s) 322, penetrating aperture(s) 340 could meet the diameter of the remote anchoring dental implant 300, 302 to substantially precisely guide the remote dental implant 302, 300 The threaded sides of the remote dental implant 302, 300 can then engage implant channel 318 as the remote dental implant is driven (by an attached implant driver—not shown) to attach properly to the remote dental anchor site 304. The formed placement channel 316, the created implant channel 318, remote dental implant 300, 302 could be seeing as common centerline longitudinal axis with one end of the shared common centerline longitudinal axis substantially terminating at the desired remote anchoring site 304.

As substantially shown in FIG. 40, the drill keys 324 could be located on those top open ends of the master tube(s) 322, penetrating aperture(s) 340 of the placement channel 316 that are generally located opposite from the remote anchoring site 304 and open out to the mouth 19. In this manner, as the drill bit 400 first passes into the placement channel 316 could first encounter each top end of the master tube 322 or penetrating aperture 340 to easily pass through those drill keys 400 located on the subsequent top ends. If the drill bit 400 passing though the placement channel 316 engages a drill key located at the bottom open end of a master tube 322 would most likely not pass through the drill aperture 356 and could end up to dislodging the drill key 324 from the master tube 322.

In another embodiment as substantially shown in FIGS. 41 and 42, a set of knurled end tubes 360 could be used instead of the drill keys 324, the knurled end tubes 360 tubes having a knurled end that prevents the knurled end tubes 360 from passing totally through master tube(s) 322 and penetrating aperture(s) 340. In one version, each knurled end tube 360 could have the outside diameter that substantially meets the diameter of the formed placement channel 316 (e.g., the internal diameter of the associated master tubes 322) to allow the knurled end tube 360 to be received within the formed placement channel 316. The internal diameter of the placed knurled end tubes 360 could meet the diameters of respective drill bits 400 as placed within the placement channel 316 to substantially provide precision to the movement of the dental drill bits 400 through the placement channel 316.

As substantially shown in FIG. 42, the knurled tubes could each have different exterior diameters to allow the knurled tube set to be nestled so as to fit all of the knurled end tubes 360 at once into the placement channel 316 to alter the operating diameter of the placement tube. The inner most knurled tube 360 could meet the smallest diameter dental drill bit 400 of the drill bit set that is first used to create the first opening of the implant channel 318. Once the first opening is made, the respective drill bit 400 and knurled end tube 360 are removed from the placement channel 316. The next largest diameter dental bit 400 is then inserted in to the remainder nestled knurled tubes 360 to further enlarge the opening for the implant channel 318. The procedure could be repeated until the last knurled tube 360 can be removed to expose the formed placement channel 316 for the placement of the remote implant 300, 302 at the remote anchor site 304.

The dental implant surgical guide 50 could comprise a dental surgical guide body 20 having a first end side 52 and second end side 54 that terminates the dental surgical guide body 52 and along with a top side 58 and a bottom side 60 that continuously connect a buccal side 62 with a lingual side 64. The bottom side 60 of the dental implant surgical guide 50 can be digitally designed and manufactured to have a contour that substantially matches and removably accepts the top 34 of the bone foundation guide 20. The top 34 of the bone foundation guide body 22 may also be digitally designed and created to substantially match and to receive the bottom side 60 of the reciprocal dental surgical guide body 52 to allow the conjoining of the two guides 20, 50 in a stackable manner so that the bone foundation guide 20 acts as a base or foundation for the dental implant surgical guide 50.

The dental surgical guide body 52 can be further penetrated by one or more implant apertures 66 that could continuously connect the top side 58 to the bottom side 60 to guide implant preparation and attachment to the dental operation site 12. Within each implant aperture 66 could be located a master tube 322, one or more such master tubes 322 could be designated to be used to create a second placement channel portion 338 as substantially show in FIG. 40. The dental surgical guide body 52 to removably attach to the body 22 could utilize a wide variety of attachment means. One such possible attachment means could make use one or more guide pins 70 and one or more guide tabs 71 and their frictional interplay with the body 22. The guide pins 70 could protrude out from the bottom side 60 by the buccal wall 62 to be removably received within pin apertures on the top 34 of the body 22 along the buccal wall 24. The one or more guide tabs 71 could extend outwards from the lingual side 64 to be respectively received by the cutouts 25 of the cutting guard 23. The guide tabs 71 and guide pins 70 along with the lingual side 64 matching the contour of the cutting guard 23 could provide a snap-in fit of the dental implant surgical guide 50 to the bone foundation guide 20.

The conjoining or stacking capability of the two guides 20, 50 could alleviate the need to remove the bone foundation guide 20 from the dental surgical site 12 prior to attaching the dental implant surgical guide 50 to the dental surgical site 12 as well as alleviate the need to attach the dental implant surgical guide 50 directly to the dental surgical site 12 and the like. This combining of the two guides 20, 50 could also reduce the time, money, effort, patient discomfort and alike that would otherwise occur if the guides 20, 50 were used separately from one and other. When so combined together, the dental implant surgical guide 50 generally surrounds the bone foundation guide's open surgical space 32 to allow implant components, implants or both to pass through the dental implant surgical guide's implant aperture(s) 66 and on through the of the open surgical space 32.

As substantially shown in FIG. 40, the dental implant surgical guide 50 alternatively could form the second placement channel portion 338 that could substantially penetrate the dental implant surgical guide 50. The second placement channel portion 338 may tandemly align with the first placement channel portion 30 to substantially form the placement channel 316 when dental implant surgical guide 50 and bone foundation guide 20 are combined. The second placement channel portion 30 could incorporate a master tube 322 with a dental drill key 350 generally used to guide various dental implant implements (e.g., dental drill bits 400) passing through the placement channel 316.

As substantially shown in FIGS. 20, 21, 22 and 23, one other possible embodiment of the invention 10 could further comprise a tissue spacing gasket 80 that can be alternatively used with the bone foundation guide 50 instead of the dental implant surgical guide 50 or the anchoring strut(s) 42. The tissue spacing gasket 80 could fit between the bottom 36 of the bone foundation guide 20 and the dental surgical site 12 to allow the proper placement of prosthesis 21 upon the placed implants by providing an approximation of the distance or thickness of the gum tissue 16 that otherwise covers the dental surgical site 12. The placement of the tissue spacing gasket 80 upon the bone foundation guide top 34 where the tissue spacing gasket 80 is generally sandwiched between the bone foundation guide 20 and the prosthesis 21 could allow the tissue spacing gasket 80 provide additional benefits besides correcting for thickness of the missing (e.g., peeled back) gum tissue 16. The tissue spacer guide 80 could help cradle the prosthesis and maintain the prosthesis proper vertical and centric positions as the prosthesis is being fixed upon the implants. When the prosthesis 21 is generally fixed about the implants (e.g., to the abutments 17 attached to the implants), dental acrylic could be injected into the prosthesis to secure implant abutments to the prosthesis. The tissue spacing gasket 80 could help block out the undercut of the abutments 17 to generally prevent the acrylic from reaching the undercuts and thus preventing unwanted or premature attachment of the prosthesis to the implants 17. The tissue spacing gasket 80 could further prevent acrylic from reaching and contaminating the exposed bone 14.

The tissue spacing gasket 80 could be made from a pliable polymer that forms a gasket top 84 upon which the prosthesis could rest and to a gasket bottom 82 which is reversibly received by the bone foundation top 34, the gasket top 84 and the gasket bottom 84 being continually connected by one or more gasket apertures 86. The one or more gasket apertures 86 could have the same alignment and size of the implant apertures 66 of the dental implant surgical guide 50. In at least one embedment, the tissue spacing gasket 80 could denote a gasket open surgical space (not shown) that continuously connects gasket top 84 and gasket bottom 82, the gasket open surgical space generally matching the footprint of the bone foundation guide's open surgical space 32.

To generally removably affix the tissue spacing gasket 80 to the bone foundation guide 20, the tissue spacing gasket 80 could have one or more gasket pins that protrude from the gasket bottom 82 and could be removably received within apertures on the bone foundation guide top 34 by the buccal wall 24 that received guide pins 70. The tissue spacing gasket 80 could further have the gasket tabs 88 that could be removably be received within the cutting guard cutouts 25. The tissue spacing gasket tabs 88 could generally match the size, placement and orientation of the dental implant surgical guide's guide tabs 71.

As substantially shown in FIGS. 27-30, another possible embodiment of the invention 10 could further comprise a bone foundation guide prosthesis 200 that can be removably combined with the body 22 of the bone foundation guide to form a bone foundation guide prosthesis-body combination 202. The combination 202 can be applied to the unaltered bone segment 14 of the dental implant surgical site 12 and can further can be used in contact with the first alveolar ridge 13 that is opposing to the dental implant surgical site 12 to check the placement of the bone foundation guide 20 upon bone segment 14 of the dental implant surgical site 12. As the respective patient bites upon the combination, the opposing or first alveolar ridge 13 (e.g., opposing teeth) could be brought into contact with the teeth portion 204 of the bone foundation guide prosthesis 200.) The various parameters (e.g., orientation, telemetry, positioning, aesthetics, and the like) as presented by the opposing alveolar ridge-to-bone foundation guide prosthesis bite 206 could reflect (e.g., generally act as an analogue representation) the final prosthesis-to-opposing first alveolar ridge bite. This bite compression could also ensure solid contact of the combination 202 upon the bone segment 14 of the dental implant surgical site 12 prior to any bone removal by use of the bone foundation guide 20. If the observed parameters or the bone foundation guide-to-bone segment fit show any significant departure or inconstancy with the surgical dental implant plan, the dental implant surgery could be halted prior to any irreversible bone alteration at the dental implant surgical site 12. The combination 202 can then be removed from the dental implant surgical site 12 (e.g., the bone segment 14) and the gum tissue can be re-sutured at the dental implant surgical site 12 to allow greater time to reformulate the associated surgical dental implant plan to take into further consideration those factors that caused the departure or inconsistency in the first place.

Figure 31:
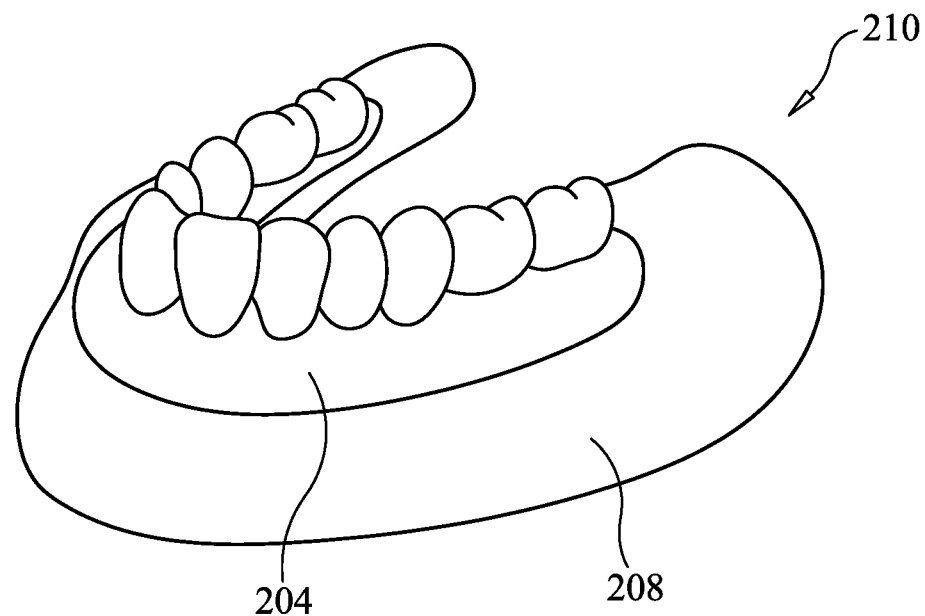
FIG. 31 is substantially a perspective view of the bone foundation guide prosthesis and denture base combined to form a denture.

As substantially shown in FIG. 31, in one possible version once the bone foundation guide prosthesis (or suitable portion thereof) 200 is removed from the body 22, the tooth portion 204 of the multiple piece or non-unitary version of bone foundation guide prosthesis 200 could be further combined with a denture base 208 to form a denture 210. In that cases where the implant surgery was halted due to bite misalignment between the first alveolar ridge (not shown) and the bone foundation guide prosthesis 200, the denture 210 could then be used by the respective patient (not shown) until proper adjustments had been made as necessary to correct the deviations or other imperfections that caused halting of the implant surgery that could allow the dental implant surgery to proceed forward again.

The bone foundation guide prosthesis 200 could be comprise the teeth portion 204 having a top side 212 substantially replicating the teeth or the bite of the final prosthesis (not shown) and a bottom side 214 that could support one or more anchor struts 42. The bottom side 214 could further define cutouts 216 that allow a visible inspection of the bone segment 14 where the bone segment 14 comes into contact with the bone foundation guide prosthesis 200 (e.g., one or more undersides 215 of the anchor struts 42 could be contoured to receive and contact a portion of the bone segment 14). In one possible embodiment, the bone guide foundation prosthesis bottom 214 could limit the bone segment contact to three points of contact to substantially prevent rocking of the bone guide foundation prosthesis 200 upon the bone segment 14.

Removable attachment of the struts 42 to the body 22 could assist the attachment of the bone foundation guide prosthesis 200 to the bone foundation guide 20. The bone foundation guide prosthesis 200 could have one or more support tabs 220 proximate to each end of the bone foundation guide prosthesis 200 that could be removably received within corresponding support slots 221 in the lingual wall cutting guard 23. Proximate to the rear end 41 of the anchor strut 42 could feature a securing tab 228 that could removably attached to a corresponding securing slot 230 also formed in the lingual wall cutting guard 23.

At least one anchoring strut 42 could have its front end 43 form an attachment tab 222 that fits into a respective tab slot 224 formed by the body's buccal wall 24 that could be accessed at the top 34. Both the attachment tabs 222 and their respective attachment slots 224 could be suitably angled to assist the attachment and removal of the bone foundation guide prosthesis 200 as the bone foundation guide prosthesis 220 moves over the buccal wall 24 for attachment or removal. A fastener channel 226 could traverse the buccal wall 24 and the attachment tab 222 (when inserted into the tab slot 224) to allow removable placement of a strut fastener 49 (not shown) placed into the fastener channel 226 to help hold the anchoring 42 strut to the top 34 of the buccal wall. It should be noted that it may not be necessary for each anchoring strut 42 to have support tab-support slot attachment capability.

Figure 27:
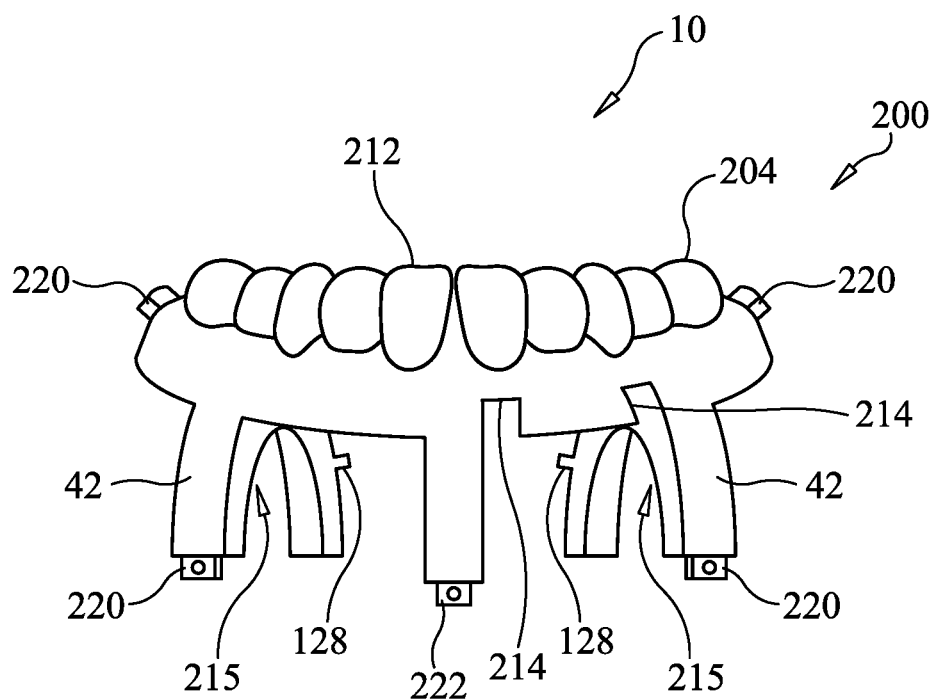
FIG. 27 is substantially a perspective view of the bone foundation guide prosthesis, the prosthesis being unitary with the anchoring struts.
Figure 28:
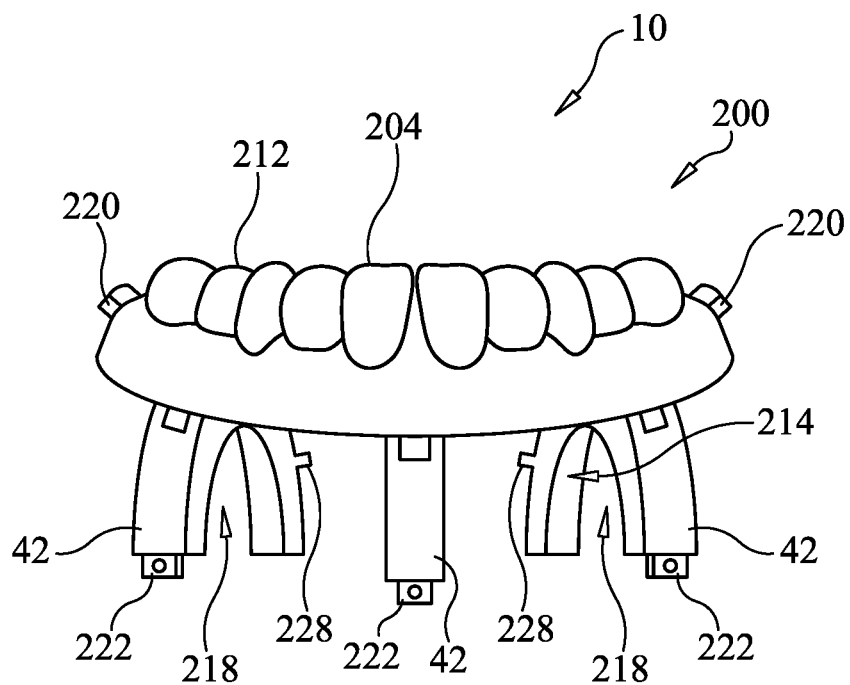
FIG. 28 is substantially a perspective view of the bone foundation guide prosthesis being non-unitary with the anchoring struts.
Figure 29:
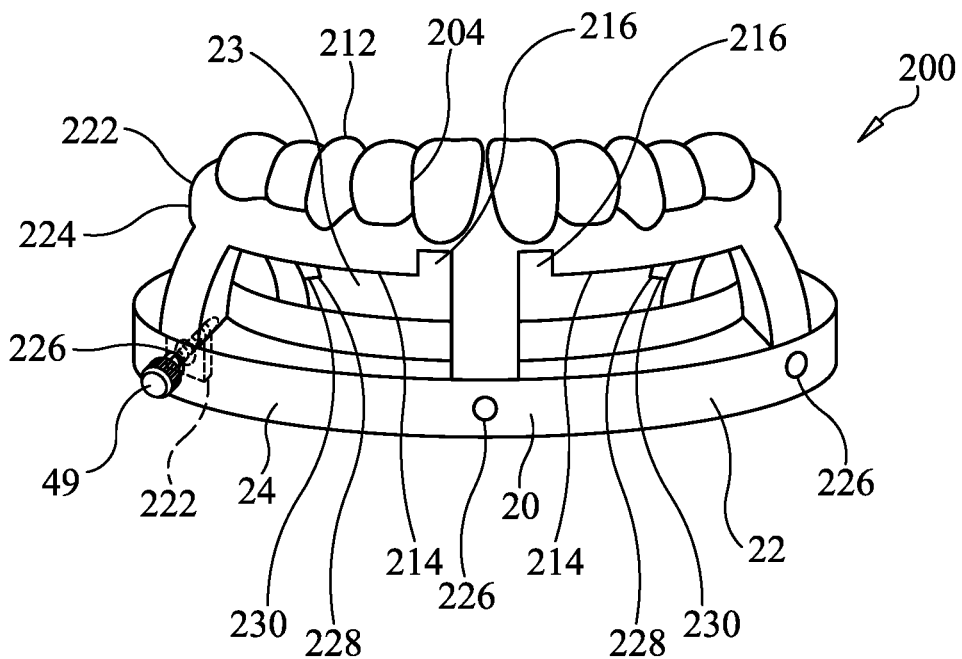
FIG. 29 is substantially a perspective cutaway view of the bone foundation guide prosthesis being combined with the bone foundation guide.
Figure 30:
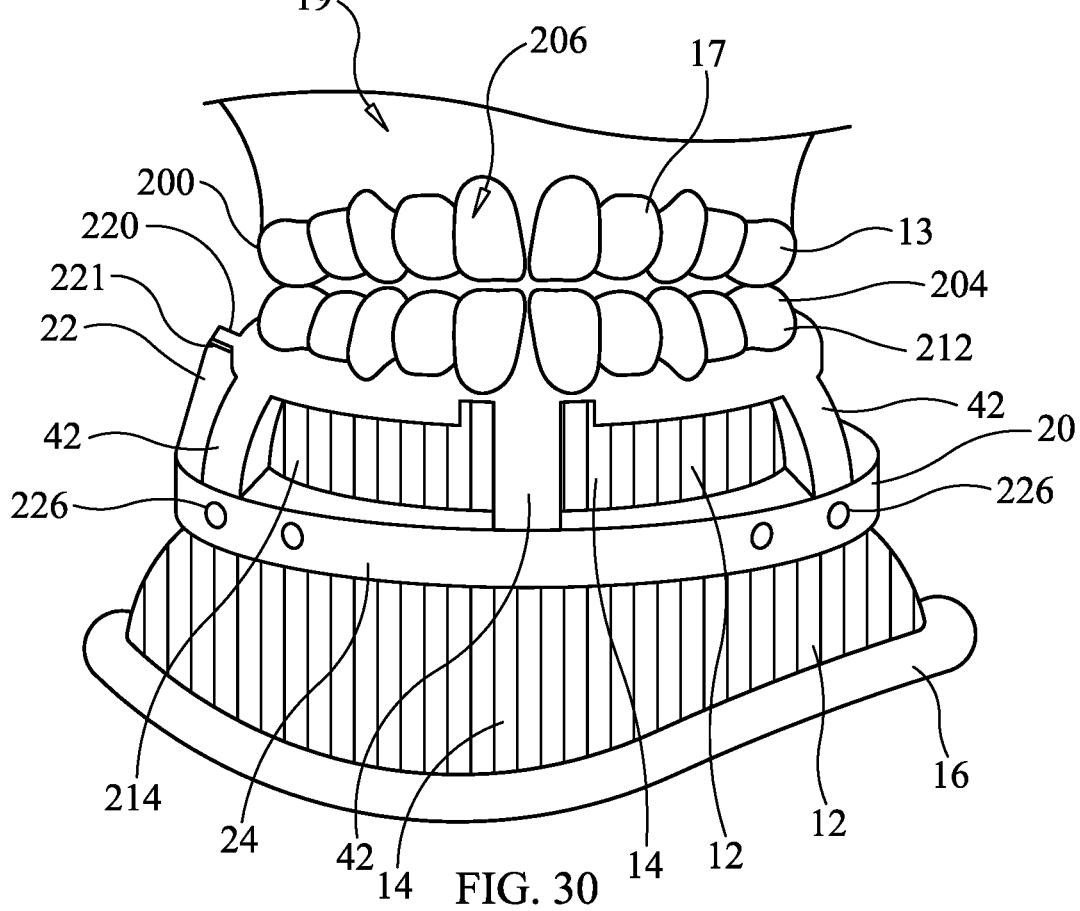
FIG. 30 is substantially a perspective view of opposing alveolar ridge brought into contact with the bone foundation guide prosthesis and the bone foundation guide combination.

As substantially shown in FIG. 27, one possible version of the bone foundation guide prosthesis 200 could have the teeth portion 204 be unitary or one-piece with the one or more struts 48 substantially providing strength and rigidity to the combination 202. In another version as substantially shown in FIG. 28, the one or more anchor struts 42 are removably attached to the bottom 214 of the bone foundation guide prosthesis 200. Friction fit based tab-slot coupling means could be utilized to removably attach the removable anchor struts 42 to the bone foundation guide prosthesis 200.

Figure 32:
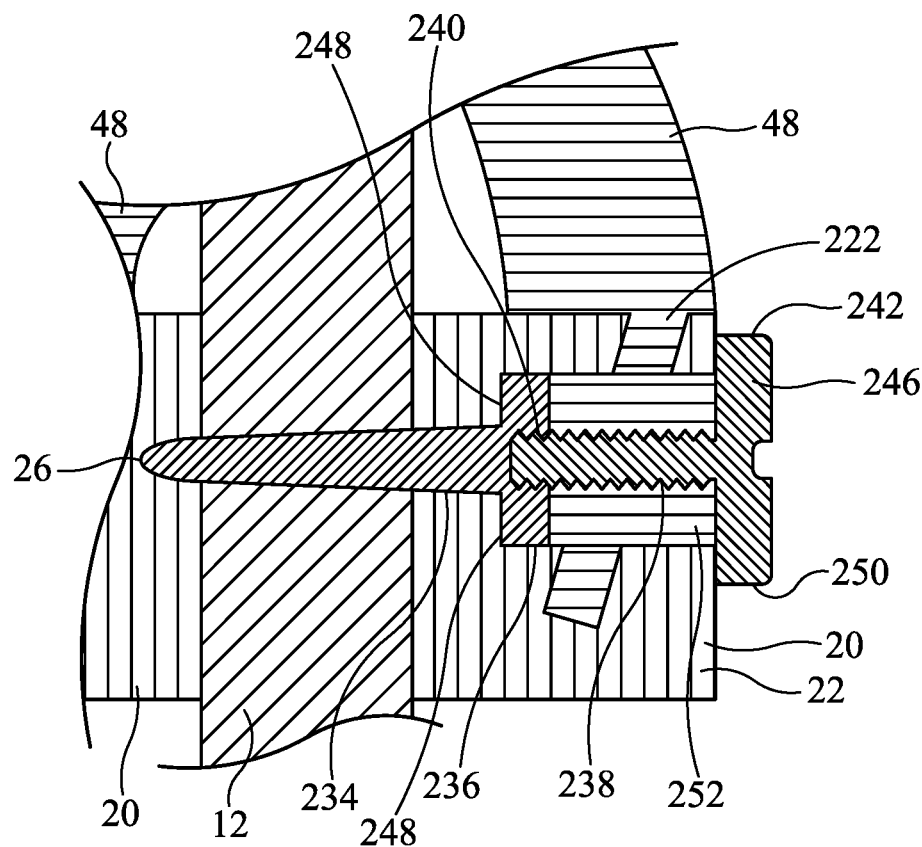
FIG. 32 is substantially a perspective view of multiple piece fastener that can connect a strut to the buccal wall and the buccal wall to the bone segment of the dental implant surgical site to allow a subsequent removal of the strut from the bone foundation guide while retaining the attachment of the buccal wall to the bone segment.
Figure 33:
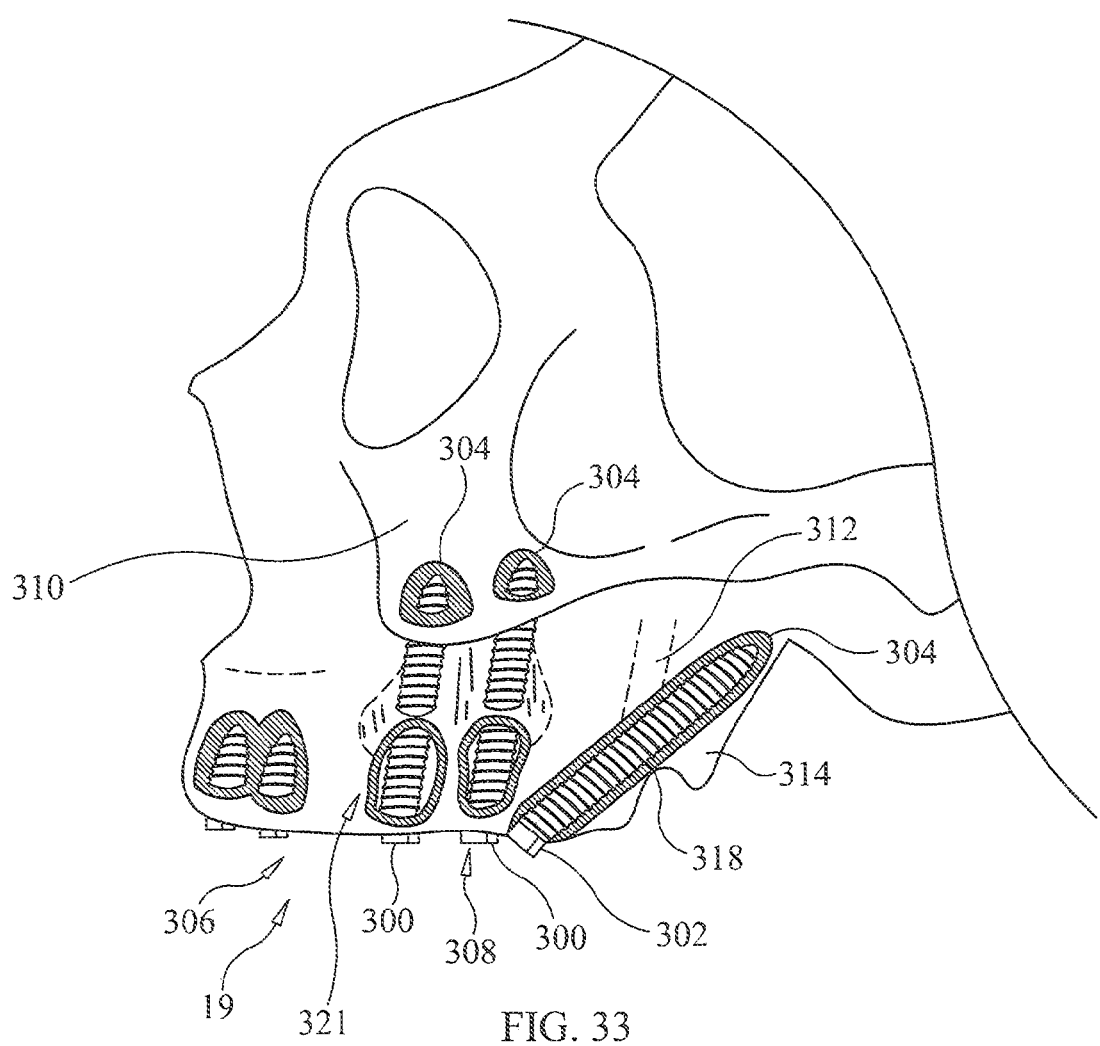
FIG. 33 is substantially showing a side elevation cutaway view of remote dental implants secured at anchoring sites remote from the mouth.
Figure 33A:
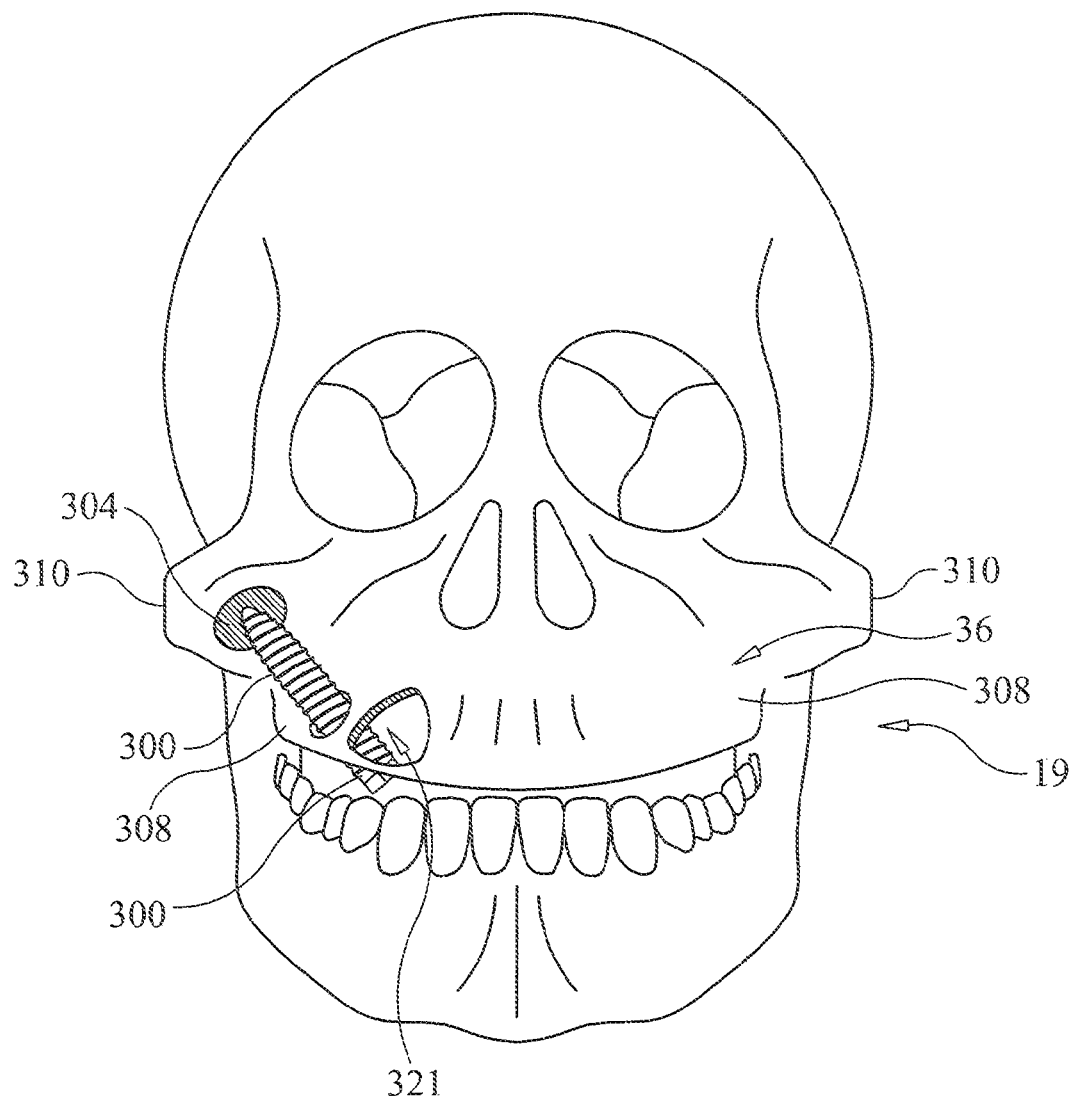
FIG. 33A is substantially showing a frontal elevation cutaway view showing a placement of a zygomatic dental implant.
Figure 33B:
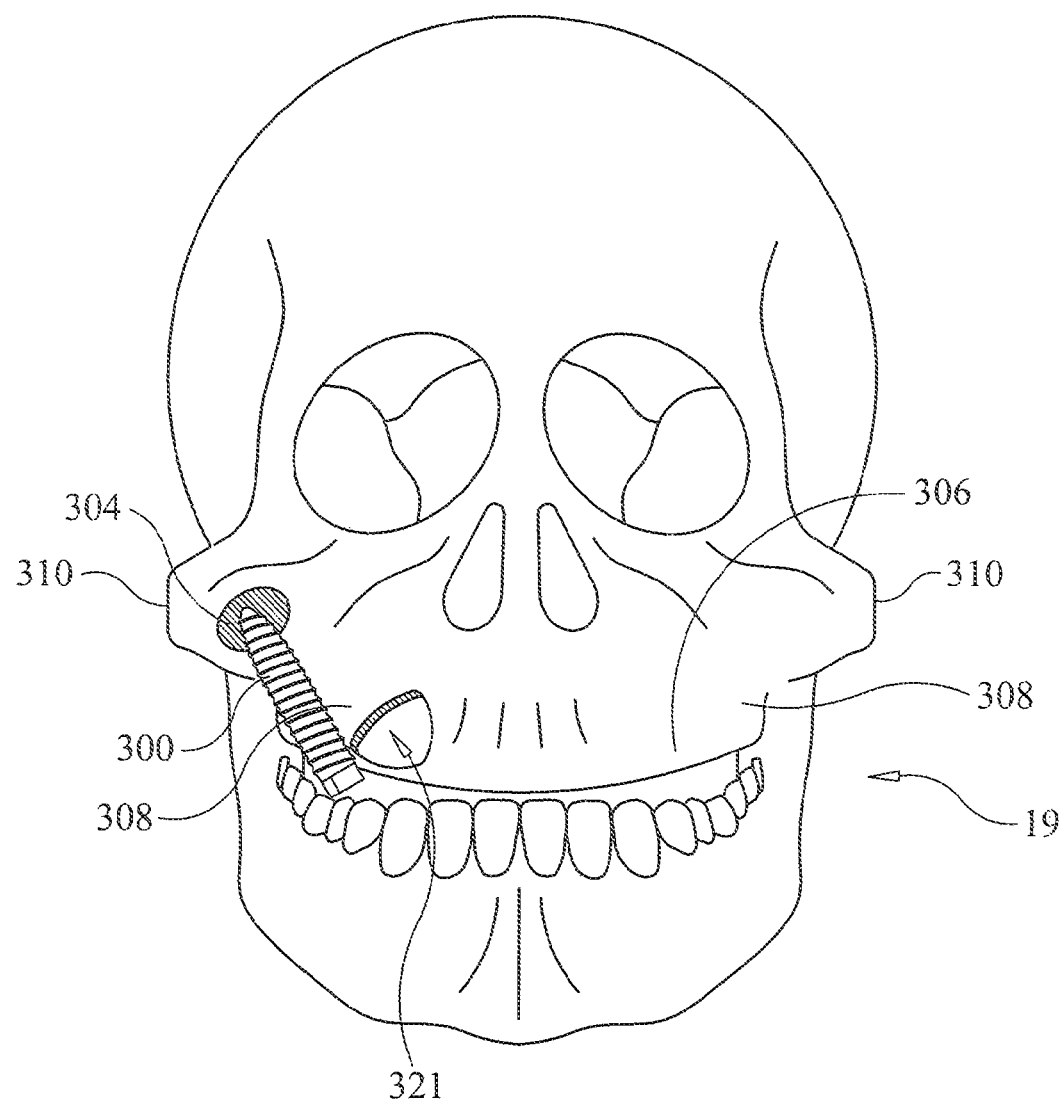
FIG. 33B is substantially showing a frontal elevation cutaway view of yet another placement of zygomatic dental implant.
Figure 33C:
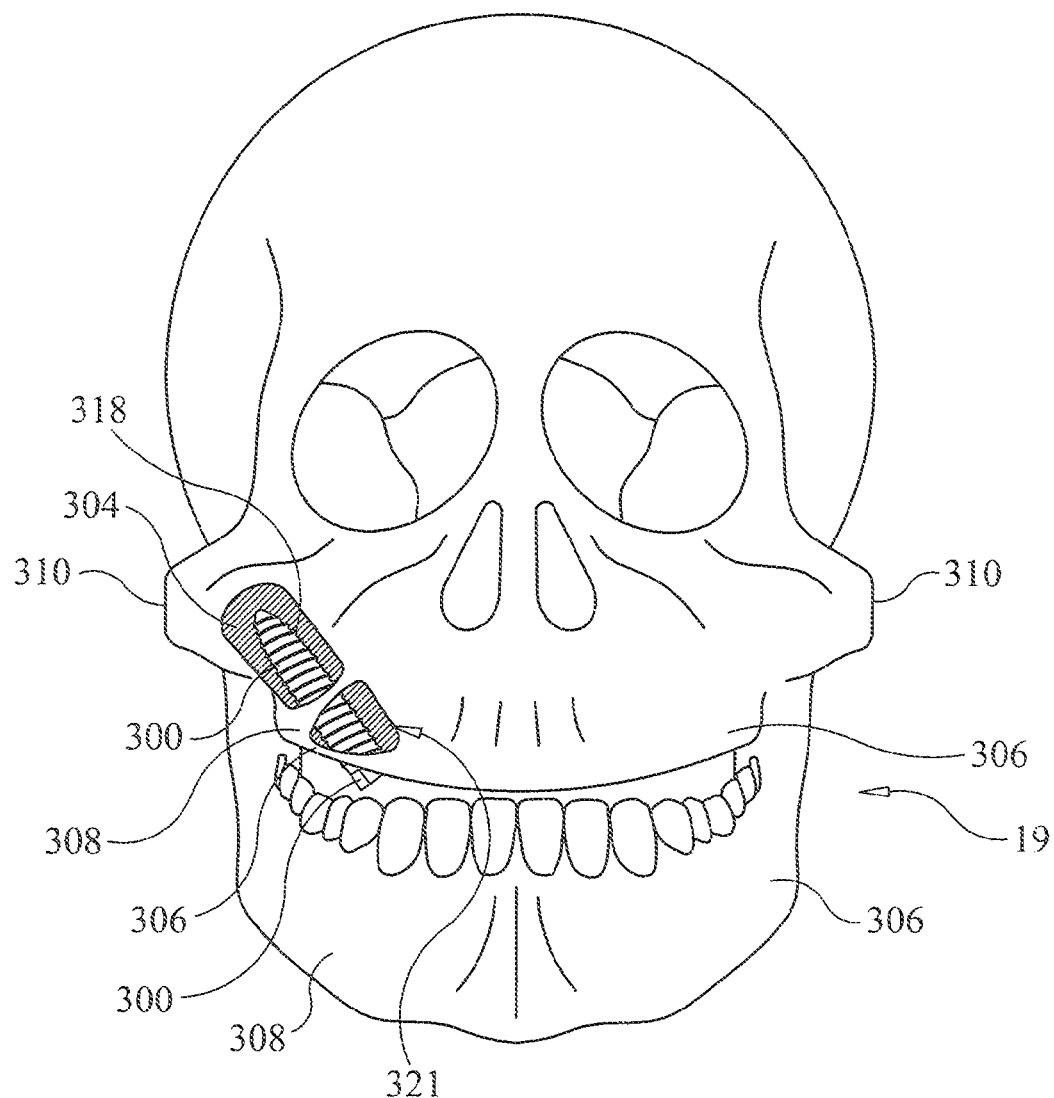
FIG. 33C is substantially showing a frontal elevation cutaway view of yet another placement of zygomatic dental implant.
Figure 34:
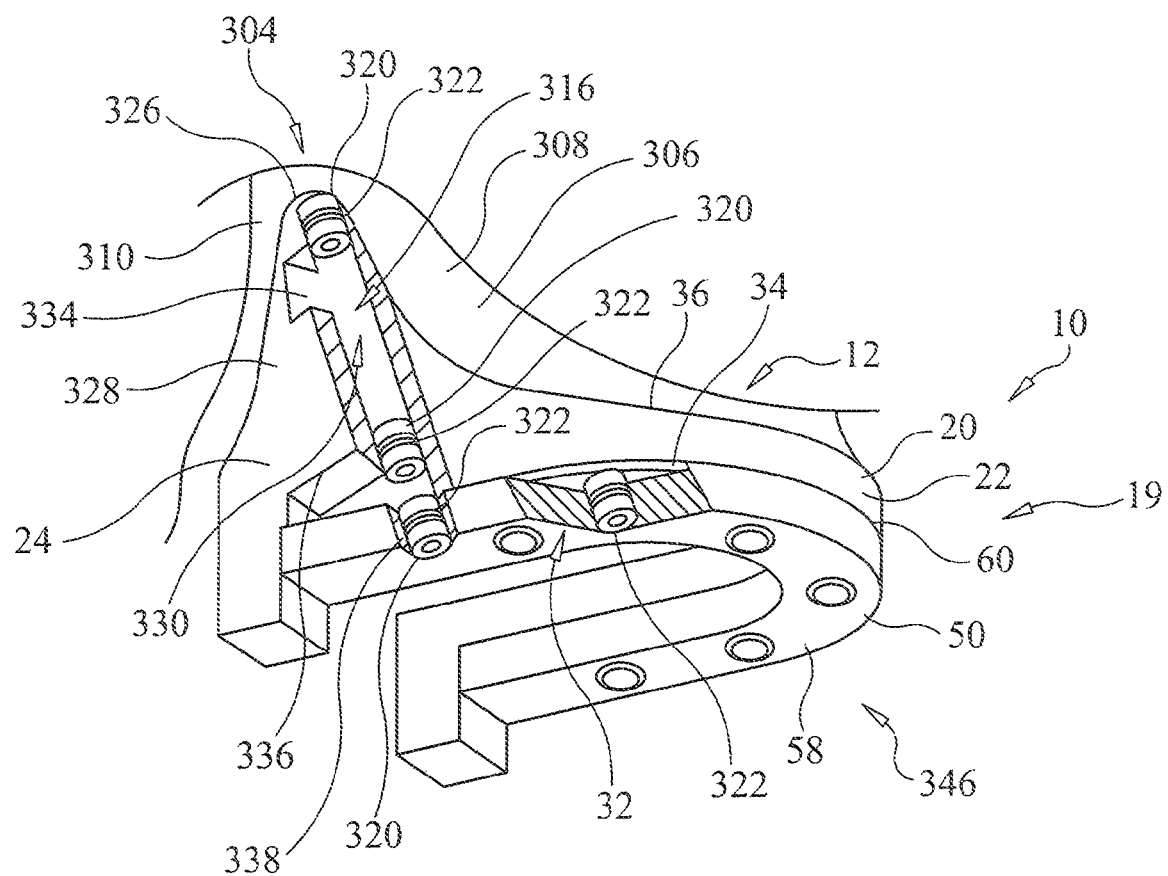
FIG. 34 is substantially showing a cutaway perceptive view of one embodiment of the combination of bone foundation guide and dental implant surgical guide forming a finger projection with placement channel.

As substantially shown in FIG. 32, one possible embodiment the strut fastener 49 could be a multiple piece strut fastener 232 that could both hold the strut front end 43 to the buccal wall 24 as well as secure the buccal wall 24 to the bone segment 14. The multiple piece strut fastener 232 could have a taper pin 234 comprising a head 236 that could further form a threaded receptacle 238. The threaded receptacle 238 could removably receive a part of a threaded portion 240 of a threaded fastener 242 to removably connect the taper pin 234 to the threaded fastener 242. The fastener head 246 could be larger in diameter than the head 236 of the tapered pin 234 to allow shoulders 248 as provided by the stepped configuration of the fastener channel 226 to support the head 236 of the tapered pin 234. The fastener head 246 could have a serrated edge 250 to allow a pliers or like (not shown) to grasp the threaded fastener 242 to pull out combined threaded fastener and taper pin from the fastener channel 226 (e.g., and from contact the bone segment 12, attachment tab 222, buccal wall 24 and lingual wall 26.) The removal of just the threaded fastener 242 only could leave the tapered pin 234 in place to secure the body 22 to the bone segment 12 while allowing the bone foundation guide prosthesis 200 to be removed from the body 22. A cylinder 252 could be placed on the threaded portion 240 of the threaded fastener 242 to assist the threaded fastener's placement into the fastener channel 226.

As substantially shown in FIGS. 7-26 and 38, one possible method or process 100 for the use of the invention could start with step 102, digital scanning and modeling for the patient-specific dental surgery. In this step, dental digital methods (digital dentistry) may be used in creating patient-specific map of the patient's mouth (which could include the digital scanning of analogue appliances such as patient specific castings and impressions); in creating models for patient-specific bone remodeling (e.g., foundation and re-contouring) of the upper and/or lower dental struts in the patient's mouth; in creating models for dental implant surgical guides/window cutting guides/bone foundation guides and prosthetics used post-patient-specific bone remodeling; in creating a patient specific model of the patient's mouth post dental surgery. After this step is substantially completed, the process 100 could proceed to step 104, creation of the guides, tissue spacing gasket and other dental appliances.

In step 104, creation of the guides and other dental appliances, the acquired and processed modeling data can be used to create the patient-specific bone foundation guide (e.g., d patient-specific bone foundation guide, tissue spacing gasket and dental implant surgical guide that be stacked together in various combinations. The anchoring struts can also be patient-specific made to have indentations at their respective apexes to match various portions of the dentition, tissue or both of the opposing alveolar ridge. Once manufactured, the anchoring struts could be removably attached to the bone foundation body. The strut fastener (e.g., a tapered pin) could removably attach the anchoring strut's front end to the buccal wall. The strut rear end could removably straddle the cutting guard's respective cutout with the strut groove allowing the strut groove's tab to be removably received within the cutout.

In another embodiment, the bone foundation guide and dental implant surgical guide could be designed and manufactured that when combined could substantially form a placement channel having multiple, tandemly aligned guiding cylinders for creating an implant channel that generally starts in the patient's mouth and generally terminates in a portion of the skull that is remote from the mouth such as the cheekbone (e.g., zygomatic process), pterygoid process or like. The placement channel could comprise of a first placement channel portion (formed by the bone foundation guide) and a second placement channel portion (e.g., generally formed by the dental implant surgical guide guide). Each placement channel portion could further encompass at least one master tube (e.g., guiding cylinder.) When the dental implant surgical guide is removably connected to the bone foundation guide, the two placement channel portions are placed in tandemly so that the two placement channels and their respective guiding cylinders could share a common longitudinal center axis.

Alternatively or in addition, the bone foundation guide and dental implant surgical guide combination could be placed over a dental key located in a penetrating aperture of the posterior maxilla bone connecting the exposed bone to the maxilla sinus cavity to substantially create an augmented first combination or a second combination. The second combination could have at least one guiding cylinder that is held in tandem alignment with another guiding cylinder (e.g., drill key) held by the penetrating aperture through which the placement channel could pass.

The design and manufacturing imparted stacking capability could allow the two guides and gasket to come together to various stacked combinations. This stacking capability allows the bone foundation guide, once removably secured to the dental surgical site by the dental health care profession, to generally act as foundation for the dental implant surgical guide or the spacing tissue gasket to secure them alternately to the dental surgical site. This stacking capability could allow the implant, implant components, implant instruments and the like to be guided through the dental implant surgical guide implant apertures and the bone foundation guide's open surgical space to properly interact with the dental surgical site. After this step is substantially completed, the process 100 could proceed to step 106, surgical prep.

In step 106, surgical prep, the dental health care professional could (after properly anesthetizes the patient and instituting other required dental surgical pre-operation protocols) could make incisions in the gum area of the dental surgical site, and peel back the gum tissue to expose the portion of bone being operated upon at the dental implant surgical site. If needed the tissue cat be peal back further to expose at least a portion of the posterior maxilla's bone (e.g., on the posterior maxilla's buccal side for sinus augmentation.) Any teeth at the dental implant surgical site can be removed. If the patient's dental health has declined enough, the alveolar ridge supporting the dental surgical site could be made edentulous.

After this step is substantially completed, the process 100 could proceed to step 108, use of the bone foundation guide.

In step 108, use of the bone foundation guide, the bone foundation guide could be removably attached to the bone foundation guide prosthesis to generally form the bone foundation guide-bone foundation guide prosthesis combination. For the non-unitary version of the bone foundation guide prosthesis, the anchoring struts could then be attached to the bottom of the teeth portion. The anchoring struts (both for unitary and non-unitary versions of the bone foundation guide prosthesis) could then be moved into place over the bone foundation guide body so that support tabs on the teeth portion and securing tabs near the rear end of the anchoring struts can removably engage their respective slots formed by the lingual wall cutting guard. The front ends of the struts can then be swung down upon the top of the buccal wall of the body of the bone foundation guide to respectively engage the attachment tabs with the attachment tab slots formed by the buccal wall. Suitable fasteners can then be placed into the fastener channels to removably secure the attachment tabs in their respective attachment slots to generally hold the bone foundation guide prosthesis in place upon the body to form the combination. The dental healthcare professional can then initially set the combination upon the bone segment of the dental implant surgical site without first having to remove or alter the bone segment.

The patient could "bite" upon the bone foundation guide prosthesis to bring the opposing alveolar ridge (e.g., the opposing the dentition, tissue or both) into contact with the teeth portion of the combination. By biting upon the combination, the patient generally holds the bone foundation guide initially in place upon the dental implant surgical site. This bite compression could allow the dental healthcare professional to view the resulting bite of the teeth portion and opposing alveolar ridge to help ensure that as the surgical plan is carried out that the final (e.g., implant attached) prosthesis will have the same bite and lockup as one shown by the bone foundation guide prosthesis. This allows the dental healthcare professional to examine the bite as well as resulting orientation, telemetry, positioning, aesthetics and the like as generally provided by the bite. Further, the dental healthcare professional can examine the bone segment and combination interface located below the teeth portion and between the anchoring arches to make sure the combination is properly set upon the bone segment. The dental healthcare professional may also use the cutouts to further examine the bone segment-combination interface.

If the alveolar ridge-teeth portion bite does not result in proper or desired telemetry, positioning, orientation, aesthetics; if the combination cannot fit properly upon the bone segment or both then the dental implant surgery can be halted until such deficiencies can be properly rectified. At that point, the combination can be removed from the bone segment, and gum tissue can be re-sutured up to cover the exposed bone segment. If non-unitary version of the bone foundation guide prosthesis is used, then the teeth portion can be removed from the arches and body. The teeth portion can be attached (e.g., glued or cemented) to a denture base to form a denture. The patent can then use the formed denture until corrections have been made to the aspects of the dental implant surgical plan, models and alike to allow the dental implant surgery to resume.

If the alveolar ridge-teeth portion bite results in proper or desired telemetry, positioning, orientation, aesthetics and if the combination fits properly upon the bone segment or then dental implant surgery can proceed with the dental healthcare professional with both hands free to use a drill to make channels in the dental surgical site (e.g., the exposed bone portion) utilizing the attachment apertures. Body fasteners are placed into the attachment apertures and channels to generally removably attach the bone foundation guide to the exposed bone at the dental surgical site. If multiple piece fasteners are used, those fasteners can further secure the through the fastener attachment of the buccal wall through the bone segment to the lingual wall of the bone foundation guide. The dental healthcare professional asks the patient to relax its grip upon the bone foundation guide to generally bring the portion of the dentition, tissue or both of the opposing alveolar ridge out of contact with the indentation(s). When the anchoring struts are cleared from the body (e.g., the threaded fasteners are removed), the bone foundation guide prosthesis could be removed from the bone foundation guide.

The removal of bone foundation guide prosthesis could clear the bone foundation guide to allow the bone foundation guide top to be used to guide a cutting implement (e.g., blade saw) to reduce the dental implant surgical site's bone structure. The harvested bone (e.g., or bone analogue) could then be used to augment the dental surgical site if needed. Known dental techniques for reducing or augmenting the bone could be employed to provide the proper bone contour for the dental implant surgical site.

Once this step is substantially completed, the process 100 could proceed to step 110, use of the dental implant surgical guide.

In step 110, use of the dental implant surgical guide, the dental health care professional could place the bottom side of the dental implant surgical guide upon the top of the bone foundation guide generally enclosing the open surgical space. In one embodiment, the tissue spacing gasket is sandwiched between the bone foundation guide and the dental implant surgical guide. Pins on the underside of the dental implant surgical guide could attach to the attachment apertures in the bone foundation guide top (e.g., by the buccal wall) while the guide tabs extending out from the lingual side could removably engage the cutting guard cutouts to provide a snap fit of the dental implant surgical guide into the bone foundation guide.

The dental healthcare professional could use the bone foundation guide and the dental implant surgical guide stacked or otherwise combined together to substantially direct and operate implant preparation implements (e.g., drills, reamers, and the like), implant components, or both by passing them through the dental implant surgical guide and into the open surgical space to properly prepare the dental surgical site to receive the implant(s) This implant preparation could ensure there was proper orientation and telemetry of the implant components and implants into the generally exposed bone of the dental surgical site. Once the bone is properly prepared to receive the implants, the implant(s) could then pass through the combination to be anchored into the bone.

In an embodiment of the invention for the locating of remote anchoring implants, the bone foundation guide, the first combination or alike as attached to the dental implant surgical site could be used to create a penetrating aperture that substantially connects the outside surface of an exposed bone of the posterior maxilla with the maxillary sinus cavity, the resulting diameter of the penetrating aperture substantially allowing the penetrating aperture to snugly yet removably receive a suitable drill key. Drill keys (e.g., smallest diameter drill keys from respective drill key sets) could then be placed in master tubes of the master guides incorporated into the formed placement channel and, if so created, the penetrating aperture(s). If windows and indentations are formed by the combination, then the suitable drill keys can be moved into or out of the windows and indentations to reach exposed ends of tandemly aligned master tubes (and penetrating aperture[s]) through which the placement channel(s) may pass. Alternatively, a set of knurled end tubes could be used instead of set of dental drill keys. In one version, a set of nested knurled end tubs could be placed in the placement channel instead of a respective dental key.

Once suitable drill keys or knurled end tubes have be placed in the placement channel, an appropriate sized diameter drill bit (e.g., the smallest diameter dental drill bit of set of dental drill bits) could then be inserted into and guided by the drill keys (or alternatively the knurled end tubes) as held by the placement channel to create the initial opening of the implant channel. For nestled knurled end tubes placed into the placement, the smaller interior diameter tubes could be removed from the placement channel to allow for the accommodation of the nest larger sized dental drill bit.

As successively larger diameter drill bits are used to widen out (and deepen as necessarily) the implant channel, the narrower aperture drill keys (or the smaller interior diameter knurled end tubes) could be swapped out for subsequent larger aperture drill keys (or the larger interior diameter knurled end tubes). As needed, the dental implant surgical guide could be removed from the bone foundation guide to allow such swapping out.

Once the implant channel is substantially properly drilled out using the placement channel, the suitable remote anchored implant (as attached to an appropriate implant driver) may be moved into and through the placement channel. The master tube interior diameter and penetrating aperture diameter generally allowing the master tube(s) and penetrating aperture(s) to substantially meet and guide the remote anchored implant as placed into the placement channel. As the remote anchored implant reaches the implant channel, the threaded sides of the remote anchored implant could engage the sides of the implant channel. If the implant channel is non-continuous (e.g., as implant channel proceeds through the maxillary sinus or proceeds outside skull bone and sinus structure) the length of the placement channel and the precision of accompanying master tubes (e.g., and the penetrating aperture) could help ensure the that tip of the remote anchor implant could be properly directed into and attached to the remote anchor site to impart the desired telemetry, orientation, positioning rotation to the anchored remote dental implant to substantially ensure the prosthesis securing end of the remote dental implant is properly positioned, located or both at the posterior maxilla to receive a dental prosthesis.

Once this step is substantially completed, the process 100 could proceed to step 112, using tissue spacing gasket.

In step 112, using tissue spacing gasket, once the implants were properly located and set within the dental surgical site, the surgical implant dental guide could be removed from the bone foundation guide and the tissue spacer gasket could alternatively be connected to the bone foundation guide. In one embodiment, the pins located on the gasket bottom can be generally be removably received in the same apertures on the bone foundation guide top that the accommodated the guide pins of the dental implant surgical guide.

In one possible embodiment, once the tissue spacing gasket is removably attached to the bone foundation guide then temporary abutments can be placed upon the implants. A temporary prosthesis can be placed over the tissue spacer gasket to come into contact the temporary abutments. The tissue spacing gasket could cradle the temporary prosthesis at this point holding it in the proper vertical and concentric orientation as dental acrylic is injected into the temporary prosthesis to secure the abutments to the temporary prosthesis. The tissue spacing gasket may further prevent the acrylic from leaking upon and contaminating the exposed bone. The tissue spacing gasket may as well as prevent any acrylic leaking onto the abutment undercut (e.g., to generally prevented unwanted premature attachment of the prosthesis to the implants.) The tissue spacing gasket may help to insure that proper distance between bone and prosthesis is maintained to account for presence of tissue when the gum tissue is placed back over the bone.

Once the acrylic has set, the above abutment prosthesis attachment process may repeated used for a clear or analogue prosthesis that later can be sent back to the lab. The analogue prosthesis with its affixed abutments may be applied to implant bone model that was devised through the dental model to see how the dental healthcare professional may have deviated from the original dental surgical plan in attaching the implants to the dental surgical site. In that manner, the analogue prosthesis will allow the final changes of the actual dental surgery (on site changes made by the dental healthcare professional to take into account issues not foreseen by the dental surgical plan) to be imparted onto the dental model and to the final prosthesis.

Once the temporary prosthesis (and analogue prosthesis) is removed from the tissue spacing gasket-bone foundation guide combination, the tissue spacing gasket could be removed from the bone foundation guide. The gum tissue flaps could be sutured back over the exposed bone (but not necessarily over the implants) and the temporary prosthesis could be reattached to the implants. As the dental surgical site heals and the implants further incorporate themselves into the bone structure, the temporary prosthesis could help maintain the implant positioning as set during the surgery, so that the permanent prosthesis should be able to replace the temporary prosthesis with minimal adjustment and fitting.

This process 100 could also allow as needed, use of temporary cylinder, associated seals, additional filling, and other sealing methods that may be used to properly prepare the dental implant for the attachment of prosthesis and the like. If healing abutments are used instead, then they can be fitted to the implants as needed. The gum tissues can then be sutured or otherwise cover-up the exposed bone to meet up with the abutment/implants. If the gum tissues need to heal or need to heal around the healing abutments or the implants require ossification to secure them in place to the bone, then after these event(s) have occurred/or a suitable amount of healing time has passed then the final prosthesis (or prosthetic) could be placed upon the implants in a secure fashion. After this step is substantially completed, the process 100 could proceed back to step 102 as needed.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

As shown in the specification, drawings, claims and abstract, the invention, a bone foundation guide system provides for the combining of a bone foundation guide and a dental implant surgical guide and a method of use for the resulting combination for the secure and accurate placement of remotely anchored dental implants.

What is claimed is:

1. A bone foundation guide system comprising:
   (A) a bone foundation guide comprising a bone foundation guide body having a buccal wall and a lingual wall that is continuously connected by a first end and a second end forming an open surgical space connecting a top of the bone foundation guide body with a bottom of the bone foundation guide body, the open surgical space being configured to receive a bone segment of a dental implant surgical site, the bottom of the bone foundation guide body being contoured to removably affix the bone foundation guide body to the dental implant surgical site, the bone foundation guide body being further contoured to guide a cutting of a protruding portion of the bone segment from the dental implant surgical site, the protruding portion of the bone segment protruding past the top of the bone foundation guide body; and
   (B) a dental implant surgical guide contoured to removably mate to the bone foundation guide body;
   wherein a combination of the bone foundation guide and the dental implant surgical guide forms a double open-ended placement channel that passes through a plurality of guiding cylinders held in tandem alignment, the plurality of guiding cylinders including a first guiding cylinder and a second guiding cylinder;
   wherein the bone foundation guide supports the first guiding cylinder;
   wherein the dental implant surgical guide holds the second guiding cylinder.

2. The bone foundation guide system of claim 1 wherein the double open-ended placement channel is configured to guide movement of at least one drill bit through the plurality of guiding cylinders to create an implant channel that terminates in a bone structure remote from a patient's mouth.

3. The bone foundation guide system of claim 1 wherein the plurality of guiding cylinders are held in spaced-apart orientation by the combination of the bone foundation guide and the dental implant surgical guide.

4. The bone foundation guide system of claim 1 wherein the at least one guiding cylinder comprises a drill key affixed to a master tube.

5. The bone foundation guide system of claim 1 wherein the bone foundation guide body further comprises a window formed on a side of the bone foundation guide to allow a drill key to be passed into the bone foundation guide.

6. The bone foundation guide system of claim 1 wherein the at least one guiding cylinder of the plurality of guiding cylinders is held by a finger projection formed by the bone foundation guide, the at least one guiding cylinder being placed proximate to an underside of a cheek bone when the bone foundation guide is placed upon the dental implant surgical site.

7. The bone foundation guide system of claim 1 wherein the plurality of guiding cylinders further includes a third guiding cylinder, wherein the third guiding cylinder is not held by the bone foundation guide, wherein third guiding cylinder is further not held by the dental implant surgical guide.

8. The bone foundation guide system of claim 7 wherein the third guiding cylinder further comprises of a dental drill key placed into a penetrating aperture.

9. The bone foundation guide system of claim 8 wherein the bone segment of the dental implant surgical site is an exposed bone of a posterior maxilla.

10. The bone foundation guide system of claim 7 wherein the combination of the bone foundation guide and the dental implant surgical guide is located over the at least one guiding cylinder.

11. The bone foundation guide system of claim 1 further comprising a finger projection formed by the bone foundation guide, the double open-ended placement channel running through the combination to exit at a tip of the finger projection.

12. A process of using a bone foundation guide system comprising the following steps:
   (A) providing a bone foundation guide comprising a body having a buccal wall and a lingual wall that is continuously connected by a first end and a second end forming an open surgical space that further connects a top of the body with a bottom of the body, the bottom is further contoured to removably receive at least a portion of a bone segment of a dental implant surgical site, the body further configured to at least removably support a dental implant surgical guide;
   (B) providing a dental implant surgical guide that removably attaches to the bone foundation guide;
   (C) forming a combination of the bone foundation guide and the dental implant surgical guide, wherein the formed combination further forms a placement channel, the placement channel passing through a plurality of guiding cylinders held in tandem alignment;
   (D) accessing one or both of zygoma bone or pterygoid bone via the dental implant surgical guide; and
   (E) connecting an outside surface of exposed bone of a posterior maxilla to a maxillary sinus cavity by a penetrating aperture in the posterior maxilla.

13. The process of claim 12 wherein the step of connecting the exposed bone further comprises a step of forming one guiding cylinder of the plurality of guiding cylinders by placing a drill key in the penetrating aperture.

14. The process of claim 12 further comprising of a step of passing a drill bit though the plurality of guiding cylinders held in tandem alignment to create an implant channel that terminates at dental implant anchoring site remote from the mouth.

15. The process of claim 12 further comprising of a step of passing a remote dental implant though the plurality of guiding cylinders held in tandem alignment to attach the remote dental implant to a dental implant anchoring site remote from the mouth.

16. The process of claim 12 wherein the forming of the combination of the bone foundation guide and the dental implant surgical guide further includes a step of holding the plurality of guiding cylinders in tandem alignment by the combination.

17. The process of claim 12 wherein the forming of the combination further comprises a step of holding several of the plurality of guiding cylinders in tandem alignment by the bone foundation guide.

18. A bone foundation guide system comprising:
   (A) a bone foundation guide comprising a bone foundation guide body having a buccal wall and a lingual wall that is continuously connected by a first end and a second end forming an open surgical space connecting a top of the bone foundation guide body with a bottom of the bone foundation guide body, the open surgical space being configured to receive a bone segment of a dental implant surgical site, the bottom of the bone foundation guide body being contoured to removably affix the bone foundation guide body to the dental implant surgical site, the bone foundation guide body being further contoured to guide a cutting of a protruding portion of the bone segment from the dental implant surgical site, the protruding portion of the bone segment protruding past the top of the bone foundation guide body;
(B) a dental implant surgical guide contoured to removably mate to the bone foundation guide body, wherein a combination of the bone foundation guide and the dental implant surgical guide forms a double open-ended placement channel that passes through a plurality of guiding cylinders held in tandem alignment; and
(C) a finger projection formed by the bone foundation guide, the double open-ended placement channel running through the combination to exit at a tip of the finger projection.

* * * * *